United States Patent Office 3,427,136
Patented Feb. 11, 1969

3,427,136
DIAZONIUM COMPOUNDS OF THE DECABORATE CAGE RADICAL
Walter H. Knoth, Jr., Mendenhall, Pa., assignor to E. I. du Pont de Nemours and Company, Wilmington, Del., a corporation of Delaware
No Drawing. Continuation-in-part of application Ser. No. 186,270, Apr. 9, 1962. This application Nov. 19, 1963, Ser. No. 324,885
U.S. Cl. 23—356    18 Claims
Int. Cl. C01c 3/16; C01b 21/54, 21/52, 21/00

ABSTRACT OF THE DISCLOSURE

Inner diazonium compounds of decaborate cage compounds can be prepared by reacting a salt of a decahydrodecaborate anion or a sulfide substituted derivative thereof with nitrous acid followed by reduction, or by diazotization of amino substituted decaborate anions (which can also be otherwise substituted). Additional substituents can be introduced by reacting the diazonium compound with electrophilic reagents.

---

This application is a continuation-in-part of my copending application Ser. No. 186,270, filed Apr. 9, 1962, now abandoned, which itself is a continuation-in-part of my application Ser. No. 135,710, filed Aug. 24, 1961, now abandoned, which, in turn, is a continuation-in-part of my application Ser. No. 6,852, filed Feb. 6, 1960, and now abandoned.

This invention relates to boron compounds and to processes for their preparation. More particularly, it relates to new boron compounds having a plurality of boron, hydrogen and nitrogen atoms.

Compounds of boron and hydrogen have achieved technical importance in recent years. However, in many potential applications, the known boron compounds have been severely limited by hydrolytic, oxidative and other types of instability. These compounds include boron hydrides, halides and alkyls. To illustrate, diborane, chlorodiborane, pentaborane and trialkyl boron compounds are spontaneously flammable in air. Diborane, pentaborane-(9), chlorodiborane, boron trichloride, iododecaborane-(14) and most other boron halides are hydrolyzed rapidly in water and alcohol. Other classes of boron compounds, e.g., the borazoles, are hydrolyzed by contact with water. Borazoles have poor thermal stability and they show reducing properties in chemical reactions, e.g., borazoles reduce silver nitrate. Even the most stable known boron hydride, i.e., decaborane(14), is hydrolyzed at a moderate rate in water. Known ionic borohydrides, e.g., tetrahydroborates ($NaBH_4$ and the like), are similarly hydrolyzed at a rapid rate at 100° C.

This invention is directed to a broad class of boron compounds which contain nitrogen and which have stability characteristics that are unusual among boron compounds, and, in particular, boron-nitrogen compounds. The compounds of the invention show unexpected hydrolytic, oxidative and chemical stabilities of the kind normally associated with aromatic compounds.

The novel boron compounds of the invention consist of ten conjoined boron atoms of which at least eight, and at most nine, of the boron atoms are bonded to hydrogen atoms or to groups capable of bonding to a nuclear carbon which is a member of a benzene ring; the compounds consisting further of one diazonium group (—$N_2$) and at most one additional group selected from the diazonium group (—$N_2$), ammonia, amines, hydrazines, organic sulfides, tri-substituted phosphines, and carboxylic amides; any remaining component in said compound being a group which can form a cation in aqueous solution.

The polyboron compounds of the invention are represented by the following generic formula:

$$M_{(1-n)}[B_{10}H_{9-n-y}X_y \cdot (N_2) \cdot nZ]_b^{n-1} \tag{1}$$

where M is a cation, i.e., an atom or group of atoms which can form one or more positively charged ions in aqueous solution; X is a monovalent substituent which can be bonded to a nuclear carbon of a carbocyclic aromatic compound by replacement of hydrogen; Z is one of the following groups: the diazonium group (—$N_2$), ammonia, an amine, a hydrazine, an organic sulfide, a tertiary phosphine, or an amide of a carboxylic acid; $n$ is 0 or 1 and represents the number of Z groups; $y$ is an integer from 0 to ($9-n$) and represents the number of X groups, and $b$ has a value of at least 1 and is otherwise equal to the valence of M.

The group X is further defined as derivable, directly or indirectly, from an electrophilic reagent. To facilitate discussion, the group X will be referred to hereinafter as an "electrophilic group."

Inspection of generic Formula 1 shows that the polyboron compounds fall into two broad subgeneric groups which are based on the value for $n$. For compounds where $n=0$, the ionic charge, represented as ($n-1$), of the group in brackets becomes —1 and the number of cations (M) also becomes 1. This subgeneric group is represented by the following formula:

$$M[B_{10}H_{9-y}X_y \cdot N_2]_b \tag{2}$$

where M, X and $b$ are defined as in Formula 1 and $y$ is an integer of 0–9, inclusive. The component, Z, does not appear in the compounds of Formula 2, which are ionic in character.

For compounds where $n=1$, the ionic charge of the group in brackets in Formula 1 becomes 0, i.e., the boron entity is electrically neutral and the number of M groups also becomes 0. This subgeneric group is represented by the following formula:

$$B_{10}H_{8-y}X_y \cdot (N_2)Z \tag{3}$$

where X and Z are defined as in Formula 1 and $y$ is an integer of 0–8, inclusive. The compounds of Formula 3 have no ionizable cation and they are non-ionic in character. They are exceptionally stable and have unusual solubilities. For these reasons, the compounds of Formula 3 are a preferred group. For other reasons, which will be described later, an especially preferred group of compounds of Formula 3 are those in which Z represents a diazonium group, a tertiary amine, a tetra-substituted hydrazine, an organic sulfide, a tertiary phosphine, or an amide.

In Formula 3 the group Z can, of course, be another diazonium, i.e., ($N_2$), group. In this event the compounds are represented by the formula $$B_{10}H_{8-y}X_y \cdot 2N_2 \tag{3a}$$

The product of Formula 3a are another especially preferred group of compounds of the invention.

Compounds of Formulas 1, 2 and 3 in which $y=0$ are unsubstituted products from which other compounds are obtained by procedures which involve replacement of hydrogen, either directly or indirectly and which will be described later. The unsubstituted compounds which fall within the scope of Formula 1 can be represented by the following formula:

$$M_{1-n}[B_{10}H_{9-n}(N_2) \cdot nZ]_b^{n-1} \tag{4}$$

where M, Z, $n$ and $b$ have the meanings given for Formula 1.

The compounds of Formula 4 can be divided into two subgroups which are based on the value of $n$, as described earlier for Formula 1. When $n=0$ in Formula 4, the compounds are represented as follows:

$$M(B_{10}H_9 \cdot N_2)_b \qquad (5)$$

where M and $b$ are defined as in Formula 1. When $n=1$ in Formula 4, the compounds are represented by the following formula:

$$B_{10}H_8 \cdot N_2 \cdot Z \qquad (6)$$

where again Z has the meaning given in Formula 1 and, in its preferred form, in Formula 3. The simplest compound of Formula 6 is, of course, $B_{10}H_8 \cdot 2N_2$.

The compounds of Formulas 5 and 6 are used, as stated earlier, in many cases to prepare the substituted products i.e., compnuds in which one or more of the hydrogens bonded to borons are replaced by electrophilic groups. Compounds of Formulas 5 and 6 are referred to, therefore, as "parent compounds."

The novel compounds of the invention have, as one common characteristic, a boron-containing component or group which in Formulas 1, 2, 4 and 5 is the portion in brackets and which in Formulas 3, 3a and 6 is represented by the entire formula. Thus, the boron-containing group can be electrically neutral, i.e., it can have an ionic charge of 0, as in Formulas 3, 3a and 6, or it can have a charge of −1, i.e., it can be a monovalent anion as, e.g., in Formulas 2, 4 and 5.

Both boron-containing groups (neutral and monovalent anion) have two additional characteristics in common, viz., (1) the component $(N)_2$ and (2) remarkable and unexpected chemical behavior which resembles in many respects the substitution reactions which aromatic compounds undergo, i.e., a chemical behavior which is best described as "aromatic." The term "aromatic" is well recognized in organic chemistry and it is discussed, e.g., in Fuson, "Advanced Organic Chemistry," p. 587, Wiley (1950).

The compounds of 0, i.e., zero, charge have, in addition to the above common characteristics, a further component in common, i.e., the group Z.

The components and characteristics which the compounds have in common will be discussed in the paragraphs which follow. At this point, however, a brief description of the boron-containing moiety is desirable. The boron-containing moiety or "boron cage" refers to 10 boron atoms which are present in the compounds and which are deemed to be joined to form a skeleton-like unit or cage in which each boron atom is adjacent to at least four other boron atoms. This cage or skeleton group of 10 boron atoms functions as a unit in chemical reactions.

The group $(N_2)$.—All of the compounds of the invention contain at least one $(N_2)$ group. This group is generally referred to as a diazonium group and may be described electronically as $$(:\overset{+}{N}=\overset{-}{N}:) \text{ or } (:N\equiv N:)$$

However, the form that predominates has not been clearly established and the group is hereinafter simply described as $(N_2)$. It may be viewed as an "inner diazonium salt" which is formed with the boron cage. The group $(N_2)$ differs in its manner of bonding from an electrophilic group (referred to in the formulas as X) since, as will be shown later, the introduction of electrophilic groups through substitution of hydrogen, has no effect on the ionic charge on the boron cage. In contrast, the introduction of one $(N_2)$ group on a $B_{10}$ cage yields a unit with an ionic charge of −1 and the introduction of two $(N_2)$ groups forms a unit with a 0 charge, i.e., an electrically neutral unit. However, it is not essential, in a 0 charge compound, that both groups in the compound should be $(N_2)$. One of the groups can be derived from other compounds as well as from $(N_2)$, and this group is designated as group Z.

Group Z.—This group, as previously stated, can be the diazonium group $(N_2)$ described above, or it can be ammonia, an amine, a hydrazine, a sulfide in which the sulfur is singly bonded to two organic groups, a phosphine in which the phosphorus is bonded to three organic groups, or an amide of a carboxylic acid.

The group Z, which includes the diazonium group $(N_2)$ in its scope, is considered to be coordinately linked to the boron cage largely through two electrons, both of which are contributed initially by the Z group. All of the groups which fall within the scope of the definition of Z have the common property of acting as Lewis bases, i.e., compounds which have within their structures an atom which is capable of donating an electron pair to the boron cage to form a stable covalent bond. Lewis bases are a well-known class of compounds and they are defined in conventional textbooks, e.g., Möeller, "Inorganic Chemistry," p. 326, Wiley (1954) and Wheland, "Advanced Organic Chemistry," pp. 80–81, Wiley (1949).

The definition of Z includes ammonia, amines and hydrazines. Amines as used herein refer to primary, secondary and tertiary amines. The amines can be aliphatic or aromatic and they includes compounds in which the nitrogen is part of a heterocyclic ring, e.g., pyridine. Hydrazines include the unsubstituted compound and compounds bearing 1–4 organic substituents on the nitrogens. Preferred basic nitrogen compounds are represented by the Formulas $Q_3N$ and $Q_2N-NQ_2$, where Q represents hydrogen or saturated open-chain hydrocarbon groups of up to 8 carbons.

Compounds in which the Z groups are ammonia, primary and secondary amines or hydrazines having 1–4 hydrogens, tend to ionize under strongly basic conditions to form hydrogen ions. Thus, these compounds can be considered as falling within the scope of compounds of Formula 2, where M is H$^+$. The preferred compounds of Formula 3 do not ionize and, for this reason, it is preferred that where Z is a nitrogen base, it is a tertiary amine or a tetra-substituted hydrazine. This subject is discussed further in the paragraph headed "Properties and Characteristics of the New Compounds."

The reagents which are operable as Z groups include a wide range of compounds. The nature of any organic groups bonded to the sulfur, nitrogen or phosphorus in these Z groups is not critical although the most preferred compounds are those which are most readily available. Thus, the preferred sulfides, phosphines, tertiary amines and tetra-substituted hydrazines are compounds which bear hydrocarbon groups bonded to the sulfur, phosphorus or nitrogen. The preferred amides are N,N-disubstituted formamides, N,N-disubstituted acetamides, and N-alkyl-2-pyrrolidones. The preferred groups of these species, as described above, can be represented as $R_2S$, $R_3P$, $R_3N$, $R_2N-NR_2$,

wherein the R groups, which can be alike or different, are hydrocarbon radicals of up to 18 carbons and wherein two of the R groups can be joined to form a ring of which the sulfur, phosphorus or nitrogen is a part. The hydrocarbon radicals are preferably free of aliphatic unsaturation. These groups are preferred solely because of availability and good reactivity to form the compounds of Formula 1.

It is emphasized, however, that the invention is not limited to compounds in which the sulfur, nitrogen or phosphorus in group Z is bonded only to hydrocarbon groups. The sulfur, nitrogen or phosphorus can be bonded to halogenated hydrocarbons, cyano-substituted hydrocarbons, oxygen-interrupted hydrocarbons, hydrocarbons having ester and amide substituents, and the like.

Examples of groups which are within the scope of Z are as follows: hydrazine, phenylhydrazine, N,N-dimethylhydrazine, N,N-diethylhydrazine, N,N'-dimethylhydrazine, N,N-diphenylhydrazine, tetramethylhydrazine, dimethyl sulfide, diethyl sulfide, dipropyl sulfide, dibutyl sulfide, di(2-ethylhexyl) sulfide, didodecyl sulfide, ethyl octadecyl sulfide, butyl dodecyl sulfide, dicyclohexyl sulfide, di(4-dodecylcyclohexyl) sulfide, ethyl cyclohexyl sulfide, methyl cyclopentyl sulfide, methyl (4-methylcyclohexyl) sulfide, methyl decahydronaphthyl sulfide, trimethylphosphine, triethylphosphine, cyclohexyldimethylphosphine, dodecyldiethylphosphine, trioctylphosphine, ammonia, monoethylamine, dibutylamine, trimethylamine, tripropylamine, triisopropylamine, trioctylamine, tridodecylamine, trioctadecylamine, dihexylmethylamine, tricyclohexylamine, cyclohexyldiethylamine, triethylamine, methyldiethylamine, ethyldidodecylamine, cyclohexyldibutylamine, methyldicyclohexylamine, triallylamine, allyldimethylamine, N-methylpiperidine, pyridine, quinoline, N-isobutylpyrrolidine, N-ethylpyrrolidine, formamide, acetamide, butyramide, 2-ethylhexenamide, stearamide, propiolamide, dimethylformamide, diethylformamide, dioctylformamide, dimethylacetamide, N-methyl - N - cyclohexylacetamide, N - acetylpiperidine, N-acetylmorpholine, N-formylmorpholine, and the like.

For each of the Z groups described above, the non-ionic compounds of the invention are represented broadly by the following formulas, including Formula 3a given earlier:

$$B_{10}H_{8-y}X_y(N_2) \cdot SR_2 \quad (7)$$
$$B_{10}H_{8-y}X_y(N_2) \cdot PR_3 \quad (8)$$
$$B_{10}H_{8-y}X_y(N_2) \cdot Q_2N-NQ_2 \quad (9)$$
$$B_{10}H_{8-y}X_y(N_2) \cdot NQ_3 \quad (10)$$
$$B_{10}H_{8-y}X_y(N_2) \cdot RC(O)NH_2 \quad (11)$$
$$B_{10}H_{8-y}X_y(N_2) \cdot RC(O)NHR \quad (12)$$
$$B_{10}H_{8-y}X_y(N_2) \cdot RC(O)NR_2 \quad (13)$$
$$B_{10}H_{8-y}X_y(N_2) \cdot HC(O)NH_2 \quad (14)$$
$$B_{10}H_{8-y}X_y(N_2) \cdot HC(O)NHR \quad (15)$$
$$B_{10}H_{8-y}X_y(N_2) \cdot HC(O)NR_2 \quad (16)$$

$$B_{10}H_{8-y}X_y(N)_2 \cdot R\overline{NC(O)CH_2CH_2CH_2} \quad (16a)$$

In the above formulas Q, R, X and y have the meanings given previously for Formulas 1 through 6. The Q and R groups in their respective formulas can be alike or different. Formulas 7 through 16 represent subgeneric groups of compounds which fall within the scope of Formula 3.

SUBSTITUTION REACTIONS OF THE BORON-CONTAINING GROUP

Prior to discussing the substituent X in the preceding generic formula, a brief description of the chemical properties of the compounds of the invention is desirable, particularly the substitution reactions which the compounds undergo in reactions with electrophilic reagents. It is particularly desirable to note at this point that the compounds of the invention in which the boron-containing unit bears hydrogen or substituents designated as X, or both hydrogen and substituents, show much greater chemical stability than many of the known hydrogen-containing boron compositions.

The behavior of the boron-containing group in chemical reactions suggests that the boron atoms are joined to form a boron cage or boron sphere which, although entirely inorganic in structure, undergoes electrophilic substitution reactions in a manner which resembles the behavior of carbocyclic aromatic compounds, e.g., benzene or naphthalene. More specifically, hydrogens bonded to borons in the compounds represented by Formulas 1 through 6 are replaceable by substituents which can also replace hydrogens bonded to nuclear carbons in benzene or a substituted benzene. This behavior of the boron-containing entity of Formulas 1 through 6 is particularly surprising since, as noted earlier, the group is entirely inorganic in composition. It is this previously unknown "aromatic character" or "aromaticity" of the boron-containing group which leads to many of the novel compounds of this invention. The substituents which replace the hydrogens, and which fall within the scope of X in the formulas of the compounds of the invention, are defined in more detail in the following paragraphs.

Group X.—This group is present in the compounds of the invention when y has a value of at least 1. In its broadest aspects X is a substituent capable of bonding to carbon of an aromatic compound by replacement of hydrogen, e.g., a group capable of bonding to a nuclear carbon of benzene, naphthalene, xylene, and the like. In a more restricted sense, X is a substituent derivable from an electrophilic reagent, i.e., a group which can be bonded to nuclear carbon of an aromatic carbocyclic compound by direct electrophilic attack to effect substitution of hydrogen bonded to the carbon. Preferably, X is a halogen or a monovalent group bonded to boron through nitrogen, carbon, oxygen or sulfur. In an especially preferred embodiment of the invention X is halogen (F, Cl, Br, and I), hydroxyl (—OH) and amine (—NH$_2$).

The definition of X, as stated above, is based on the close similarity in chemical substitution reactions between the essentially inorganic boron-hydrogen cage of the compounds of the invention and the classical aromatic carbon-hydrogen rings of organic chemistry. X, therefore, represents a broad range of substituents.

The group X can represent a substituent which is present on the decaborate employed as a reactant in the process for introducing the diazonium group. The group X can also represent a substituent which is introduced by a direct reaction with the parent compound, i.e., a compound of Formula 5 or 6, or it can represent a substituent obtained by subsequent chemical modification of a group which has been introduced by direct reaction, e.g., a substituent obtained by reduction, esterification, hydrolysis or amidation of directly introduced groups. Substituents which are introduced by direct reaction are, for convenience, referred to as electrophilic groups and these groups form a preferred class of substituents. Thus, in this preferred group, X is a monovalent electrophilic group which is capable of bonding to carbon of a benzene nucleus by reaction of benzene or a substituted benzene (toluene, naphthalene) with an electrophilic reagent. These reagents are defined more fully in later paragraphs.

An electrophilic group, derivable from an electrophilic reagent, is deficient in electrons and has a point of low electron density. Electrophilic groups and reagents which are employed to effect substitution of such groups for the hydrogen on a carbon of a benzene nucleus are described in conventional textbooks of which the following are examples:

Remick, "Electronic Interpretations of Organic Chemistry," p. 532, 100–1, Wiley (1943).
Ingold, "Structure and Mechanism in Organic Chemistry," pp. 198–200, 269–304 (especially pp. 202, 211), Cornell University Press (1953).
Fuson, "Advanced Organic Chemistry," Chap. 1, Wiley (1953).
Wheland, "Advanced Organic Chemistry," 2nd ed., p. 83, Wiley (1949).

Examples of electrophilic groups, i.e., substituents which are derivable from electrophilic reagents, which are included within the scope of X are as follows: halogens (F, Cl, Br, I), hydrocarbon, carboxyl

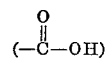
(—C(=O)—OH)

carbamyl and N-substituted carbamyl

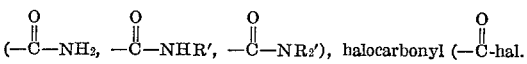
(—C(=O)—NH$_2$, —C(=O)—NHR', —C(=O)—NR$_2$'), halocarbonyl (—C(=O)—hal.

where hal, is F, Cl, Br, I),
halomethyl (CH$_2$-hal.),
hydroxy (—OH),
hydrocarbyloxy (—OR'),
acetal [—CH(OR')$_2$], ketal [—CR'(OR')$_2$],
hydrocarbylcarbonyloxy [—OC(O)R'],
hydrocarbyloxycarbonyl [—C(O)OR'],
isocyanate (—NCO),
cyanate (—OCN),
thiocyanate (—SCN),
isothiocyanate (—NCS),
hydrocarbylthio (—SR'),
hydroxymethyl (—CH$_2$OH),
hydrocarbyloxymethyl (—CH$_2$OR'),
dihydrocarbylaminomethyl (—CH$_2$NR$_2$'),
cyano (—CN),
amino (—NH$_2$),
substituted amino (—NHR', —NR$_2$'),
trihalomethyl (—CCl$_3$, —CF$_3$, etc.),

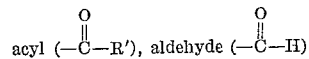

nitro (—NO$_2$),
nitroso (—NO),
azido (—N$_3$),
azo (—N=N—Ar, where Ar is an aromatic hydrocarbon, e.g., phenyl, naphthyl, p-quaterphenyl, and the like),
sulfo (—SO$_3$H),
sulfonyl (—SO$_2$R'),
and acetoxymercury

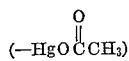

R', where used in the above substituents, is a monovalent organic group which is preferably a hydrocarbon group (alkyl, cycloalkyl, alkenyl, cycloalkenyl, aryl, alkaryl, aralkyl, and the like) of at most 18 carbons.

Description of M.—The compounds of Formulas 1, 2, 4 and 5 include the group M which is defined as an atom or group of atoms which forms a cation in aqueous solution. More explicitly, M is an atom or group of atoms which in aqueous solution forms a positively charged ion. The sole function of M is to provide the necessary positive charges to combine with the negative charge present on the boron-containing group and permit isolation of the characterizing boron-containing group as a compound. Thus, the only essential characteristic of M is that it bear one or more positive charges. The properties of the group M are not critical and this group, therefore, represents a broad range of elements and combinations of elements. To illustrate, M can be hydrogen, hydronium (H$_3$O$^+$), a metal, a metal-amine complex, ammonium (NH$_4$$^+$), hydrazonium (NH$_2$—NH$_3$$^+$), N-substituted ammonium, N-substituted hydrazonium, S-substituted sulfonium, P-substituted phosphonium, and the like. To illustrate further, M can be lithium, sodium, cesium, beryllium, barium, magnesium, calcium, strontium, lanthanum, manganese, iron, cobalt, copper, zinc, mercury, thallium, tin, lead, silver, or any other metal. As further and more specific examples, M can be R$^2$NH$_3$$^+$, R$^2$$_2$NH$_2$$^+$, R$^2$$_3$NH$^+$, R$^2$$_4$N$^+$, (R$^2$NH—NH$_3$)$^+$, (R$^2$$_2$N—NH$_3$)$^+$, R$^2$$_3$S$^+$, R$^2$$_4$P$^+$, [Zn(NH$_3$)$_4$]$^{+2}$, [Co(NH$_3$)$_6$]$^{+2}$, [Cu(NH$_3$)$_4$]$^{+2}$, Al(H$_2$O)$_6$$^{+3}$, [Cu(NH$_2$CH$_2$CH$_2$NH$_2$)$_2$]$^{+2}$, and the like. The substituents represented by R$^2$ in the above illustrations are organic groups whose character or nature is not a critical feature of these cation groups. The substituents represented by R$^2$ can be open-chain or closed-chain, saturated or unsaturated, or the substituents can be composed of heterocyclic rings of which the nitrogen is a component, e.g., cations derived from pyridine, quinoline, morpholine, hexamethyleneimine, and the like. Preferably, R$^2$, for reasons of availability of reactants, is a hydrocarbon group of at most 18 carbons.

Examples of representative compounds are given below solely to illustrate the invention and they are not to be considered as limiting the scope of operable compounds:

$B_{10}H_8 \cdot 2N_2$,
$B_{10}H_8 \cdot (N_2) \cdot S(CH_3)_2$,
$B_{10}H_8 \cdot (N_2) \cdot S(C_4H_9)_2$,
$B_{10}H_8 \cdot (N_2) \cdot S(C_{12}H_{25})_2$,
$B_{10}H_8 \cdot (N_2) \cdot S(C_6H_{11})_2$,
$B_{10}H_8 \cdot (N_2) \cdot CH_3SC_{18}H_{37}$,
$B_{10}H_8 \cdot (N_2) \cdot P(C_2H_5)_3$,
$B_{10}H_8 \cdot (N_2) \cdot P(C_6H_{11})_3$,
$B_{10}H_8 \cdot (N_2) \cdot P(C_3H_7)_3$,
$B_{10}H_8 \cdot (N_2) \cdot P(C_2H_5)_2(C_{12}H_{25})$,
$B_{10}H_8 \cdot (N_2) \cdot N(CH_3)_3$,
$B_{10}H_8 \cdot (N_2) \cdot N(C_6H_{11})_3$,
$B_{10}H_8 \cdot (N_2) \cdot N(CH_3)(C_8H_{17})_2$,
$B_{10}H_8 \cdot (N_2) \cdot HC(O)NH_2$,
$B_{10}H_8 \cdot (N_2) \cdot CH_3C(O)NH_2$,
$B_{10}H_8 \cdot (N_2) \cdot HC(O)N(C_6H_{13})_2$,
$B_{10}H_8 \cdot (N_2) \cdot CH_3C(O)N(C_{12}H_{25})_2$,
$B_{10}H_8 \cdot (N_2) \cdot HC(O)NHC_{18}H_{37}$,
$B_{10}H_8 \cdot (N_2) \cdot CH(O)N(CH_3)_2$,
$B_{10}H_8 \cdot (N_2) \cdot CH_3C(O)N(C_2H_5)_2$,
$B_{10}H_8 \cdot (N_2) \cdot C_3H_7C(O)N(CH_3)_2$,
$B_{10}H_8 \cdot (N_2) \cdot CH_3C(O)\overline{NCH_2CH_2OCH_2CH_2}$
$B_{10}H_8 \cdot (N_2) \cdot NH_2—NH_2$,
$B_{10}H_8 \cdot (N_2) \cdot H_2N—N(CH_3)_2$,
$B_{10}H_8 \cdot (N_2) \cdot H_2N—NHC_6H_5$,
$(CH_3)_4NB_{10}H_9 \cdot N_2$,
$C_2H_5NH_3B_{10}H_9 \cdot N_2$,
$Ba(B_{10}H_9 \cdot N_2)_2$,
$C_6H_5NHNH_3B_{10}H_9 \cdot N_2$,
$(C_6H_5)_2NH_2B_{10}H_9 \cdot N_2$,
$(CH_3)_3SB_{10}H_9 \cdot N_2$,
$(CH_3)_4PB_{10}H_9 \cdot N_2$,
$[BH_2 \cdot 2N(CH_3)_3]B_{10}H_9 \cdot N_2$,
$LiB_{10}H_9 \cdot N_2$,
$NaB_{10}H_9 \cdot N_2$,
$KB_{10}H_9 \cdot N_2$,
$Ca(B_{10}H_9 \cdot N_2)_2$,
$Ba(B_{10}H_9 \cdot N_2)_2$,
$Mg(B_{10}H_9 \cdot N_2)_2$,
$Cu(B_{10}H_9 \cdot N_2)_2$,
$Zn(B_{10}H_9 \cdot N_2)_2$,
$Hg(B_{10}H_9 \cdot N_2)_2$,
$Al(H_2O)_6(B_{10}H_9 \cdot N_2)_3$,
$AgB_{10}H_9 \cdot N_2$,
$Pb(B_{10}H_9 \cdot N_2)_2$, and the like. Further examples of the compounds of the invention are as follows:

$B_{10}H_5F_3 \cdot 2N_2$,
$B_{10}Cl_8 \cdot 2N_2$,
$B_{10}H_3Br_5 \cdot 2N_2$,
$B_{10}H_7I \cdot 2N_2$,
$B_{10}H_6F_2 \cdot N_2 \cdot S(CH_3)_2$,
$B_{10}H_7C(O)CH_3 \cdot 2N_2$,
$B_{10}H_7OH \cdot 2N_2$,
$B_{10}H_5(OH)_3 \cdot 2N_2$,
$B_{10}H_7OH \cdot N_2 \cdot P(C_4H_9)_3$,
$B_{10}H_7SH \cdot 2N_2$,
$B_{10}H_8 \cdot N_2 \cdot S(CH_2CH_2OH)_2$,
$B_{10}H_8 \cdot N_2 \cdot S(CH_2CH_2CN)_2$,
$B_{10}H_8 \cdot N_2 \cdot S(C_6H_4Cl)_2$,
$B_{10}H_8 \cdot N_2 \cdot S(C_6H_4NO_2)_2$,
$B_{10}H_8 \cdot N_2 \cdot N(CH_2CH_2OH)_3$,
$B_{10}H_8 \cdot N_2 \cdot N(CH_2CH_2CN)_3$,
$B_{10}H_8 \cdot N_2 \cdot S(C_6H_5)(C_6H_4COOH)$,
$B_{10}H_8 \cdot N_2 \cdot N(CH_2CH_3)(CH_2CH_2COOH)_2$,
$B_{10}H_7OCH_3 \cdot 2N_2$,
$B_{10}H_7OC(O)CH_3 \cdot 2N_2$,
$B_{10}H_6(OC_2H_5)_2 \cdot N_2 \cdot N(C_2H_5)_3$,
$B_{10}H_7C(O)C_6H_5 \cdot 2N_2$,
$B_{10}H_7C_2H_5 \cdot 2N_2$,
$KB_{10}H_6F_3 \cdot N_2$, $CsB_{10}H_5Cl_4 \cdot N_2$,
$Ca(B_{10}H_6Br_3 \cdot N_2)_2$,
$Ba(B_{10}H_7I_2 \cdot N_2)_2$,
$KB_{10}H_6F_3 \cdot N_2$,
$CsB_{10}H_5Cl_4 \cdot N_2$,
$Ca(B_{10}H_6Br_3 \cdot N_2)_2$,
$Mg(B_{10}H_7I_2 \cdot N_2)_2$,
$Zn[B_{10}H_8(OH) \cdot N_2]_2$,
$Pb(B_{10}H_8OC_2H_5 \cdot N_2)_2$,
$B_{10}H_6(COOH)_2 \cdot 2N_2$,
$NaB_{10}H_8COOH \cdot N_2$, and the like.

PROPERTIES AND CHARACTERISTICS OF THE NEW COMPOUNDS

The compounds are generally crystalline solids at conventional atmospheric temperatures and pressures. They are stable in storage for prolonged periods. The products are usually colorless or white. However, their color and physical properties are influenced to some extent by the substituent X, the group Z and by the cation M, if it is present. For example, X may contain a chromophoric group or the cation M may be colored.

Many of the compounds dissolve to some extent in water or hydroxylated solvents, e.g., alcohols. The compounds fall into two broad groups in their behavior in water. The compounds of Formula 2 are generally ionic in character, i.e., they behave like salts and form ions in solution. The compounds of Formula 3 are neutral and non-ionic, i.e., they are not salt-like in character and they do not form ions. The compounds of Formula 3 are soluble in conventional organic liquids (alcohol, acetone, ether, and the like). Their solubility in water is low.

In the above discussion, the ionic or non-ionic properties of the compounds refer to a charge which is inherent in the boron-hydrogen cage structure. The value of the ionic charge is independent of and does not take into consideration any ionic charge which may reside in the X and Z components by virtue of ionizable functional groups. The ions which are formed by ionizable groups on X and Z components are considered to be part of these components and these ions are included within the definitions of X and Z. For example, carboxyl, sulfo, amino and like substituent groups, whether present in X or Z, will function as groups which possess acidic or basic properties which are independent of the properties of the boron cage structure.

In the broad class of compounds of the invention, represented by Formula 1, a small group exists whose composition conforms to both Formulas 2 and 3. The compounds are those of Formula 2 in which M is H+ and in which the substituent X is a basic nitrogen group in which hydrogen is bonded to the nitrogen, e.g., —$NH_2$, —$NHR$, —$NHNH_2$, —$NHNR_2$, and the like. In these compounds the proton (H+) is closely associated with the basic nitrogen in the group X and the compounds, therefore, display some properties which resemble closely the properties of the compounds of Formula 3. To illustrate, a compound of the formula $HB_{10}H_8(NH_2) \cdot N_2$ behaves in many respects as though it had the structure $B_{10}H_8 \cdot N_2 \cdot NH_3$; a compound of the formula $$HB_{10}H_8(NHNH_2) \cdot N_2$$

behaves as though it had the structure $$B_{10}H_8 \cdot N_2 \cdot NH_2NH_3$$

Compounds of this type do not show strong ionizing properties but they do form salts in strongly basic solutions and, in this respect, behave as compounds of Formula 2. They can, therefore, be classed in either group.

The ionic and the electrically neutral compounds of the invention, i.e., the compounds of Formulas 2 and 3, do not reduce solutions of silver nitrate. The compounds react smoothly with halogens with minimum side reactions to form halogen substituted derivatives in which halogen is bonded to boron. The compounds are not decomposed in the presence of aqueous solutions of inorganic bases.

PREPARATION OF NEW COMPOUNDS (1) By nitrosation and reduction.—A general process for obtaining compounds of Formulas 5 and 6, referred to as parent compounds, in which Z is an ($N_2$) group or a sulfide group ($SR_2$) consists of the following steps:

(a) Reaction of nitrous acid with a polyboron compound of the formula:

$$M_2'B_{10}H_{10} \qquad (17)$$

or $$M'B_{10}H_9 \cdot SR_2 \qquad (18)$$

where M' is hydrogen, $NH_4$, substituted ammonium or an alkali metal, and R is a hydrocarbon group, preferably alkyl, of up to 18 carbons.

(b) Reacting the product obtained in step (a) with an appropriate reducing agent.

(c) Optionally reacting the product obtained in step (b) with an electrophilic reagent to obtain a product bearing one or more X groups.

The reactants, $M_2'B_{10}H_{10}$ and $M'B_{10}H_9 \cdot SR_2$, are not generally available compounds. They are obtained by relatively simple methods from a decaborane(12)/organic sulfide of the general formula $B_{10}H_{12} \cdot 2YSY'$, where Y and Y' are hydrocarbon groups, preferably alkyl. The preparation of the reactants is described briefly in the following paragraphs and the processes are illustrated for specific compounds in Examples A and B.

The adduct $B_{10}H_{12} \cdot 2YSY'$, is obtained by reacting decaborane(14), i.e., $B_{10}H_{14}$, with an organic sulfide of the formula $YSY'$, where Y and Y' have the meanings given earlier, at a temperature of about 0–150° C. until approximately 1 mole of hydrogen is evolved. The decaborane(12)/organic sulfide adduct is isolated and it is then reacted with liquid ammonia or an amine for about one hour to obtain the salt $M_2'B_{10}H_{10}$, where M' represents the group derived from ammonia or the amine, e.g., $NH_4^+$ $(CH_3)_3CNH_3^+$, and the like. These salts readily undergo metathetic reactions in solution with other compounds having a wide range of M' groups to obtain products of the formula $M_2'B_{10}H_{10}$, e.g., $[(CH_3)_2NH_2]_2B_{10}H_{10}$, $$Li_2B_{10}H_{10}$$

$Na_2B_{10}H_{10}$, $Cs_2B_{10}H_{10}$, and $K_2B_{10}H_{10}$. The preparation of this class of reactants is described in my U.S. Patents 3,148,938; 3,148,939; and 3,149,163.

The optional reactant $M'B_{10}H_9 \cdot SR_2$, which can be employed in the first step of the process is prepared by reacting a decahydrodecarborate(2−), obtained as described above, i.e., $M_2'B_{10}H_{10}$, with a sulfoxide of the formula $R_2S=O$, where the R groups can be alike or different and are, preferably, saturated hydrocarbon groups of up to 18 carbons. The reaction is conducted in solution in the presence of a strong acid, e.g., a mineral acid, at a temperature of —20° C. to 110° C., preferably at 0–75° C. The reaction is exothermic and cooling can be applied, if necessary, to maintain the temperature at the desired point. The product is isolated by conventional methods. The preparation of a representative compound of this group of reactants is illustrated in Example B. The preparation of this class of reactants is also described in my U.S. Patent 3,296,260.

Nitrosation step.—The first step in the process for preparing the compounds of the invention, i.e., reaction of a decaborate with nitrous acid, is conducted by well known methods which are employed for diazotization of aromatic amines, e.g., see Wagner and Zook, "Synthetic Organic Chemistry," p. 772, Wiley and Sons (1953). In one mode of operation an aqueous solution of the polyborate salt and a strong inorganic acid, e.g., hydrochloric acid, is cooled to about 10° C. or lower and sodium nitrite is added to the solution. The procedure can be varied by dissolving sodium nitrite in a solution of a strong mineral acid at 10° C. or less, followed by addition of the polyborate. The reaction frequently is vigorous and cooling may be necessary to maintain the desired temperature. The temperature of the reaction usually lies between about +25° and −25° C. with a preferred range of +15° to −15° C. The reaction is normally completed within a period of at most one hour and little or no advantage is found in prolonging the reaction time. The reaction is conducted conveniently at atmospheric pressure although pressures higher or lower than atmospheric can be employed. The ratio in which the reactants are used is not critical. The ratio, moles $HNO_2$/moles polyborate, can lie between about 0.2 and 5.0; a preferred ratio lies between about 0.5 and 2.0.

In the event an insoluble reaction product forms it is separated by conventional methods and employed as the reactant in the second step. In the absence of any substantial quantity of insoluble product, the reaction mixture is normally filtered to clarify it. The reaction product at this stage was originally considered to be a substituted polyhydropolyborate in which the substituents were solely nitroso (—NO) groups. The product is now believed to contain substituent groups, bearing nitrogen and oxygen whose composition is not yet established and to contain also a small quantity of product bearing the ($N_2$) substituent.

Reduction step.—The product obtained above is reduced by well known methods. The filtered reaction mixture can be employed, or if the product is insoluble, it can be dissolved in solvents such as alcohols or ethers. The reducing agent is brought into contact with the solution with stirring and reduction of the nitrosated compound proceeds rapidly. Examples of operable reducing agents are tetrahydroborates and complex metal hydrides (e.g., $NaBH_4$, $LiBH_4$, $LiAlH_4$, and the like), metal-acid combinations (e.g., Zn/HCl, Fe/HCl, and the like), and other known catalytic reducing combinations. An insoluble product forms which is a non-ionic species of Formula 6 in which the Z group is determined by the polyborate employed as a reactant in the first step of the process, i.e., the reactant $M_2'B_{10}H_{10}$ yields the compound $B_{10}H_8 \cdot 2N_2$ at this stage in the process and the reactant $M'B_{10}H_8 \cdot SR_2$ yields the compound $B_{10}H_8 \cdot N_2 \cdot SR_2$. The insoluble products are separated, for example, by filtration from the liquid portion of the reaction mixture. The liquid portion contains a compound of Formula 5, i.e., $M(B_{10}H_9 \cdot N_2)$ which is isolated, preferably by contacting the liquid portion with a reactant containing a cation which forms an insoluble salt with the $B_{10}H_9 \cdot N_2^{-1}$ anion. Conventional procedures are employed which are well known in chemical practice.

(2) By diazotiazation of amino-substituted decaborates.—A second generic process for preparing the compounds of the invention consists in contacting a diazotizing reagent with a decaborate of the formula $$M_a[B_{10}H_{10-y-m}X_y(NH_2)_m]_b \qquad (19)$$

where M and X are defined as in Formula 1, $m$ is 1 or 2, $y$ is a cardinal number of 0 to (10−$m$), $a$ and $b$ are positive whole numbers whose values are determined by the valence of M and are the smallest whole numbers which satisfy the equation $$2b = a \times \text{valence of M} \qquad (19a)$$

A preferred group of reactants are compounds of Formula 19 in which M is a metal or a quaternary ammonium group. An especially preferred group of reactants are compounds of Formula 19 in which M is an alkali metal or alkaline-earth metal. In these preferred groups the cation M is derived from a strong base.

The boron-containing reactants of Formula 19 are not generally available compounds. They can be prepared by processes which are illustrated in the examples given later and which are described fully in my copending application, Ser. No. 237,392, filed Nov. 13, 1962.

The diazotizing agents are well-known compounds which are described in standard reference works on organic chemistry [see, e.g., Wagner and Zook, "Synthetic Organic Chemistry," referred to earlier]. The terms "diazotizing," and "diazotization," as employed herein, refer to a well-known process employed in organic chemistry particularly with aromatic amines [see, e.g., Fuson, "Organic Chemistry," page 520, Wiley and Sons (Inc.) (1950)] although in the present invention the process is applied to essentially inorganic compounds. Examples of operable diazotizing agents include nitrous acid, nitrosyl halides, nitrosylsulfuric acid, nitrosyltetrafluoroborate and the like.

The reaction is generally conducted by contacting the diazotizing reagent with a solution of the boron-containing reactant of Formula 19 at a low temperature, preferably at less than 15° C.

The solvent or liquid medium employed in the process is preferably non-aqueous although aqueous solvents can be employed for suitably-substituted boron-containing reactants. Decision on whether to use an aqueous solvent e.g., water, can be made readily by recognizing that the basicity of amino groups on the decaborate anion is influenced to some extent by the presence or absence of other substituents (designated as X) in Formula 19. To illustrate, in the compound $H_2B_{10}H_8(NH_2)_2$ in which there are no X substitutes, the two protonic hydrogens are so tightly bonded with the amine groups that, in solution, the concentration of the $B_{10}H_8(NH_2)_2^{-2}$ anion is too low to allow diazotization to proceed at a reasonable rate. In this compound and in similar compounds in which the amine groups are strongly basic, it is preferable to use salts, e.g., alkali metal or alkaline earth metal salts [$Na_2B_{10}H_8(NH_2)_2$, $Li_2B_{10}H_8(NH_2)_2$, $CaB_{10}H_8(NH_2)_2$, and the like] in place of the free acids and to use non-protonic solvents, e.g., ethers, to avoid hydrolysis of these salts.

In procedures employing non-aqueous solvents, nitrosyl-type diazotizing reactants can be employed, e.g., NOCl, $NOBF_4$, and the like. In the event the amino-substituted decaborate anion contains, in addition to the amine groups, a preponderance of electron-withdrawing substituents (e.g., halogens) the base strength of the amine groups is substantially reduced. For this type of compound, the acid of the substituted decaborate anion can be employed in aqueous solution with nitrous acid as the diazotizing reactant.

The process is conducted in a conventional manner employing corrosion-resistant vessels, e.g., glass, poly(tetrafluoroethylene) resin, stainless steel, platinum and the like. The vessel is charged with a solution of the decaborate. The reaction mixture is preferably cooled to less than 15° C. and the diazotizing agent is gradually added to the solution. In the event the diazotizing agent is a gas it can be bubbled into the solution. The diazotizing agent can be prepared in situ, particularly when the reaction is conducted in aqueous solution. An alkali metal nitrite (for example, $NaNO_2$, $KNO_2$ and the like) is added to the cooled solution and an acid is added later, e.g., acetic acid, sulfuric acid, hydrochloric acid and the like, to form a solution of nitrous acid in the mixture. The procedures with variations are well known (see earlier reference to Wagner and Zook, "Synthetic Organic Chemistry") and they can be applied to the present reaction with no, or at most little, modification.

The temperature of the reaction is generally maintained below 15° C., preferably below 10° C. Very low temperatures offer no advantage and generally, the temperature employed lies between about −20° C. and 10° C. The operation is conducted most conveniently at atmospheric pressure, although pressures higher or lower than atmospheric can be employed. The reaction proceeds rapidly and is generally completed within ten hours or less. Normally a reaction time of not over one hour is sufficient. The ratio of reactants is not critical.

The ratio, moles diazotizing agent/moles decaborate, can lie between about 0.2 and 5.0; a preferred ratio lies between 0.5 and 2.0.

The crude reaction product is isolated and purified by the methods described in first process in the previous paragraphs for preparing the compounds of the invention.

The compounds obtained by diazotization have the formula $$M_{2-m}[B_{10}H_{10-y-m}X_y(N_2)_m]_b$$

wherein M, $m$, $y$ and X are as previously defined in this section and $b$ is at least one and is otherwise equal to the valence of M.

(3) *Introduction of Z groups.*—A generic process for obtaining compounds of Formula 6 in which Z is other than $N_2$ consists in reacting $B_{10}H_8 \cdot 2N_2$ with ammonia, an amine, a hydrazine, a phosphine, an organic sulfide, or an amide to replace one ($N_2$) group. The reaction is conveniently conducted by simply mixing the reactants, optionally in a solvent and heating the mixture. A solvent is employed preferably when both reactants are solids to bring the components into intimate contact. The temperature of the reaction is not critical and it can be controlled conveniently by operation at the boiling point of the solvent or of a liquid reactant. Preferably, the temperature lies between about 50° C. and 200° C.

The time for the reaction and mole ratios of the reactants are not critical factors for operability. To illustrate, the time may be short, e.g., 15 minutes or less, or it may be as long as 24 hours or longer. The rate of reaction and therefore the time needed for replacement of one ($N_2$) group is related in many cases to the temperature at which the reaction is conducted. The mole ratio of reactants, i.e., moles of Z/moles of $B_{10}H_8 \cdot 2N_2$ usually lies between about 0.1 and 10; preferably the ratio lies between about 0.5 and 2.0.

The products obtained in the process are isolated and purified by well known methods, e.g., evaporation of solution, filtration of the reaction mixture and crystallization from solvents.

(4) *Introduction of X groups.*—Compounds of Formulas 1, 2, 3 and 3a in which the value of $y$ is at least 1 are prepared, preferably by a modification of the general process described in procedure No. 1. In the modified process a boron-containing reactant is employed in which the desired X group or groups are already present. To illustrate, the reactants represented by Formulas 17 and 18 in procedure No. 1, step (a), are subjected to one or more substitution reactions as a first step to obtain products of the following formulas:

$$M_2'B_{10}H_{10-s}X_s (20) \quad \text{or} \quad M'B_{10}H_{9-t}X_t \cdot SR_2 \quad (21)$$

where M' has the meaning given for Formulas 17 and 18; X is defined as in Formula 1; $s$ is a positive whole number of 1–9 (preferably 1–8) and $t$ is a positive whole number of 1–8. The substituted compounds are then subjected to the nitrosation and reduction steps in procedure No. 1. Preparation of compounds of Formulas 20 and 21 is described in my copending application and patent to which reference was made earlier, viz., Ser. No. 237,392, filed Nov. 13, 1962, and U.S. Patent 3,296,260. Disclosures of preparation of reactants in the above copending application and patent are incorporated herein by reference.

(5) *Optional process for preparing compounds bearing X groups.*—Optionally, compounds of Formulas 1, 2, 3 and 3a in which the value of $y$ is at least 1 are obtained by applying the substitution reactions, described in my copending application and patent referred to in procedure No. 4, to compounds of Formula 4. Compounds of Formula 4 include the two subgeneric groups represented by Formulas 5 and 6. In this procedure side reactions occur sometimes which result in reducing the yield of the desired product. This method is, therefore, less preferred than that described in procedure No. 4.

In either method the group X is derived, directly or indirectly, from a reagent which is capable of introducing a monovalent substituent into a benzene nucleus by replacement of hydrogen bonded to carbon of said nucleus. This reactant is referred to frequently as an electrophilic reagent and it is discussed in more detail in later paragraphs. For simplicity, the discussion refers most frequently to compounds of Formula 4 as reactants but it is understood that the discussion applies equally well to the preparation of the substituted reactants employed in procedure No. 4.

Electrophilic reagents which are broadly operable in the process are reagents which will effect direct substitution of hydrogen bonded to carbon of a benzene nucleus, i.e., the hydrogen is replaced by a group derived from the electrophilic reagent. Electrophilic reagents are compounds which react by acquiring electrons or acquiring a share in electrons which previously belonged to a foreign molecule (see Ingold, vide supra, p. 201). Examples of electrophilic reagents which are within the scope of the above definition and which are operable in the process of the invention are given below, together with the substituent group which in the process is bonded to boron in the final product.

| Electrophilic reagent | Electrophilic group bonded to boron |
|---|---|
| Halogens ($F_2$, $Cl_2$, $Br_2$, $I_2$) | Halogen (F, Cl, Br, I) |
| Olefins (acid catalyst) | Alkyl (e.g., $-C_2H_5$, $-C_3H_8$) |
| $R^3COCl$ | $-\overset{O}{\underset{\|}{C}}R^3$ |
| $R^3SO_2Cl$ (acid catalyst) | $-\overset{O}{\underset{\|}{S}}\overset{O}{\underset{\|}{-}}R^3$ |
| $H_2S$ | $-SH$ |
| $R^3SSR^3$ | $-SR^3$ |
| Acetone (acid catalyst) | $OH$ |

Compounds bearing $-OH$ substituents can be reacted (1) with alcohols ($R^3OH$) in the presence of acids to obtain products of Formula 1 in which X is $-OR^3$ and (2) with acid anhydrides to obtain compounds in which X is $$-O\overset{O}{\underset{\|}{C}}-R^3$$

In the above groups, $R^3$ is an organic radical, preferably hydrocarbon of at most 18 carbons, which can be alkyl, alkenyl, cycloalkyl, cycloalkenyl, aryl, alkaryl, aralkyl, and the like.

In the reactions employing the above electrophilic reagents, a catalyst may be used, e.g., aluminum trichloride, boron trifluoride and polyphosphoric acid. These catalysts are employed in the same manner as in the well known procedures in organic chemistry.

The electrophilic reagents employed in the process are materials which are usually readily available or which are obtained by conventional methods.

Reaction of the boron compounds with the electrophilic reagent is conducted in conventional vessels with corrosion-resistant inner surfaces, e.g., glass, platinum, poly (tetrafluoroethylene)resin, and the like. The boron-containing reactant, and optionally an inert liquid solvent, is charged into the reaction vessel. The electrophilic reactant is then supplied to the reaction vessel at a temperature and at a rate which will provide a controllable reaction and which will bring the reaction to completion within a reasonable time. When electrophilic reagents are employed which are hydrolytically stable, water or alcohols (methanol, ethanol) or combinations of these solvents can be used conveniently as a solvent for the reaction. Other solvents can be used, for example, diethyl ether, benzene, heptane, carbon tetrachloride, carbon disulfide, and the like for reactants which are not soluble in water.

The temperature at which the reaction is conducted will be determined largely by the reactivity of the electrophilic reagent. In general, the temperature will be between about −20° and 200° C. Preferably, the temperature will be between about 0° and about 150° C.

The time of reaction in a batch process will also depend to a considerable extent on the reactivity of the electrophilic reagent. The reaction generally proceeds rapidly and, with thorough mixing of the reactants, the time may be as low as five minutes or even less. Generally a reaction time between about 10 minutes and 5 hours is sufficient. It is desirable and advantageous to mix the reactants by any suitable means although mixing is not essential for operability.

The reaction can be conducted under pressure, if desired, but it is not essential to use pressure. In most cases the reaction proceeds satisfactorily at atmospheric pressure.

The proportions in which the reactants are used are not critical. It is preferable, in order to obtain maximum yield of desired product, to use at least one mole of the electrophilic reagent for each hydrogen which is to be replaced on the boron-containing reactant. It is not essential, however, that these ratios be used.

The compounds are purified by well known and recognized procedures. For stable products, conventional crystallization procedures are used, employing water or inert organic solvents, e.g., benzene, alcohol. Solutions of Formulas 20 and 21, bearing X groups of one kind, e.g., activated carbon or silica gel, to absorb the major portion of the impurities.

The procedures described above provide a range of methods for obtaining the compounds of the invention. Combinations of these procedures can be employed and many variations can be used which are within the knowledge of a skilled chemist. To illustrate, a reactant of Formulas 20 and 21, bearing X groups of one kind, eg., acetyl, can be reacted as described in procedure No. 1, steps (a) and (b) and the resulting product can then be reacted with an electrophilic reagent to provide a different X group, e.g., bromine, to obtain a compound of Formula 1 in which the X's are acetyl and bromine.

Compounds of Formula 1 in which X is halogen (fluorine, chlorine, bromine and iodine) or hydroxyl are of particular interest and this group of compounds form a preferred class. Their preparation is described in more detail in the paragraphs below.

(6) Halogenation.—Compounds of Formula 1 in which one or more X groups are halogen are obtained preferably by procedure No. 2, employing compounds of Formula 19 in which one or more X substituents are halogen.

The halogen-substituted compounds can also be obtained by passing elemental halogen into a solution of a polyborate of Formula 4 which includes the compounds of Formulas 5 and 6. Any halogen can be employed, i.e., fluorine, chlorine, bromine and iodine. The gaseous halogens, e.g., fluorine and chlorine, can be used in admixture with an inert carrier gas, e.g., nitrogen, if desired. This procedure is preferable with fluorine as a reactant to moderate the reaction.

The process is conducted most conveniently in aqueous solution in the event the reactants are soluble in water. Solvents other than water are operable, e.g., methanol, ethanol, carbon tetrachloride, benzene and the like, and these solvents can be used to obtain solutions of reactants. The reaction is conducted at atmospheric pressure and generally at prevailing atmospheric temperature; if desired, heating can be used to increase the rate of reaction.

The ratio of reactants is not critical but it is preferred to use the halogenating agent in sufficient quantity to obtain a product with the desired number of halogen substituents. The ratio, moles halogenating agent/moles $B_{10}$ salt, usually lies between about 0.5 and 50; preferably, the ratio is from 1.0 to about 30.

Time, temperature and pressure are not critical factors in the process. The temperature can lie between about 10° C. and the boiling point of the solvent. The temperature generally does not exceed 150° C. The pressure is preferably atmospheric but it can be higher or lower than atmospheric.

Compounds of Formula 1, where the X groups are unlike, can be obtained by partially halogenating compounds of Formula 3 with one halogen, e.g., chlorine, followed by further partial halogenation with a second halogen, e.g., bromine, and if desired, halogenation with a third halogen, e.g., iodine. The procedure can be modified to obtain whatever combination of halogens is desired in the products.

(7) Introduction of hydroxyl groups.—Compounds of Formula 2 where X is —OH are obtained by employing as reactants a compound of Formula 6 where Z is an amide, i.e., a compound which can be represented as $B_{10}H_8 \cdot N_2 \cdot$amide, whose preparation has been described in procedure No. 2, "Introduction of Z groups."

The $B_{10}H_8 \cdot N_2 \cdot$amide reactant is mixed with an aqueous solution of a strong base and the mixture is heated until a clear solution is formed. The solution contains the hydroxyl-bearing compound which can be isolated by conventional procedures, e.g., precipitation by treatment with an appropriate cation, neutralization of the solution with an acid, passage through an ion-exchange resin and the like.

The amide in the reactant $B_{10}H_8 \cdot N_2 \cdot$amide does not appear in the final product and the nature of the amide is, therefore, not critical. It is preferred for reasons of cost and economy to use N-substituted lower-alkyl carboxylic amides and cyclic amides such as N-methyl-2-pyrrolidone. Operable amides include N,N-dimethylformamide, N,N-diethylformamide, N,N-dimethyl-acetamide, N,N-dibutylacetamide, and similar carboxylic amides.

Any strong base can be employed in the process. Alkali metal hydroxides (NaOH, KOH, LiOH), alkaline earth metal hydroxides [Ca(OH)$_2$, Ba(OH)$_2$] and quaternary ammonium hydroxides [(CH$_3$)$_4$NOH,

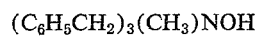
(C$_6$H$_5$CH$_2$)$_3$(CH$_3$)NOH and the like] are operable. The concentration of the base in solution is not critical; preferably a concentration of 2–20% is employed.

The reaction mixture is generally heated to expedite the rate of the reaction. The temperature of the reaction may lie between about 20° C. and 100° C.; preferably, the temperature lies between about 50° and 100° C.

For preparation of compounds which bear two or more X groups which are unlike, e.g., —Cl, —SCH$_3$, and —NO$_2$, a compound of Formulas 1, 2, 3 or 3a can be employed as the boron-containing reactant which contains at least one hydrogen or at least one X group bonded to boron atoms.

(8) Metathetic reactions.—Compounds of Formula 2, wherein M covers a wide range of cations, are obtained by simple metathetic reactions. To illustrate, an aqueous solution of a compound of Formula 2, where M is NH$_4^+$ is contacted with a strong acid or with a strongly acidic cation exchange resin to obtain the free acid, i.e., a compound of Formula 2 in which M is H. The acid, generally in solution, is reacted with oxides of metals, hydroxides of metals, salts of metals (both organic and inorganic), nitrogen bases, sulfonium hydroxides or halides, phosphonium hydroxides or halides, aryldiazonium hydroxides or halides, and similar types of compounds to obtain products of Formula 1 which have the desired cation M. In a process employing an ion-exchange resin, strongly acidic resins of the cross-linked poly(arylsulfonic acid) variety are preferred because of availability, e.g., "Amberlite" IR–120(H) and "Dowex" 50. The acid, so obtained in aqueous solution, can be reacted with nitrates, chlorides, bromides, acetates, benzoates and similar salts of metals or other bases to obtain salts of Formula 2.

To illustrate, an aqueous solution of $(CH_3)_3SB_{10}H_9 \cdot N_2$ is passed through a column packed with a commercial polystyrenepolysulfonic acid resin to obtain the acid, $HB_{10}H_9 \cdot N_2$ in aqueous solution. Any salt of Formula 2 in solution (water, methanol, ethanol, methanol-acetonitrile, and the like) can be employed to prepare the corresponding acid. The acids can be isolated, if desired by evaporation of the solution.

It is convenient to isolate the acids as hydrates. In the hydrated form part of the water of hydration is considered to be associated with the ionizable protons. In general, one or more (as many as five) molecules of water are associated with the ionizable proton and the acids can be represented as having a hydrated proton, e.g., $(H_3O)B_{10}H_9 \cdot N_2$,
$(H_3O)B_{10}H_5Cl_4 \cdot N_2$,
$(H_3O)B_{10}H_7(Br)_2 \cdot N_2$,
$(H_3O)B_{10}H_7I_2 \cdot N_2$,
$(H_3O)B_{10}H_7(OH)_2 \cdot N_2$,
$(H_3O)B_{10}H_8OCH_3 \cdot N_2$,
$(H_3O)B_{10}H_8SCH_3 \cdot N_2$, and the like. The acids, as isolated, can contain up to 12 molecules of water of hydration.

Careful concentration of the solutions of the acids and intensive drying under low pressure and moderate temperature, of the liquid residues yields the acids, generally as hydrates as discussed earlier. For many chemical reactions it is not necessary to isolate the acids from solution. The solutions of the acids can be employed directly, especially in metathetic reactions.

Metal salts of the invention can be prepared by neutralization of the acids, obtained as described above, in aqueous or alcohol solution with an aqueous solution or suspension of an inorganic base, e.g., an alkali or alkaline earth metal hydroxide. The resulting aqueous solution of the metal salt of the $(B_{10}H_{9-y}X_y \cdot N_2)^{-1}$ anion is concentrated by evaporation of water or alcohol until the salt crystallizes out. In many cases the salt may precipitate during its preparation and evaporation of the solution is not necessary. The crystalline salt is dried under reduced pressure, e.g., 0.1 mm. of mercury, and moderately elevated temperature, e.g., 50–100° C. The metal salts frequently contain water of hydration which can be removed by heating for several hours at a temperature of about 200° C. under low pressure, e.g., 0.1 mm. mercury or lower. Specific examples of salts which can be obtained by the process described above are:

$NaB_{10}H_9 \cdot N_2$,
$KB_{10}H_7F_2 \cdot N_2$,
$Ca(B_{10}H_7Cl_2 \cdot N_2)_2$,
$NH_4B_{10}H_7(OH)_2 \cdot N_2$,
$Zn(B_{10}H_7Br_2 \cdot N_2)_2$,
$(CH_3)_3SB_{10}H_8OCH_3 \cdot N_2$,
$(C_4H_9)_4PB_{10}H_7I_2 \cdot N_2$,
$Zn(NH_3)_4(B_{10}H_8NO_2 \cdot N_2)_2$, and the like.

Water-insoluble heavy metal salts of the acids can be prepared by adding a water-soluble heavy metal salt, e.g., silver nitrate or mercuric nitrate, to an aqueous solution of the boron-containing acid. Examples of these salts are:

$AgB_{10}H_9 \cdot N_2$,
$Hg[B_{10}H_8OC(O)CH_3 \cdot N_2]_2$,
$AgB_{10}Cl_9 \cdot N_2$, and
$Hg[B_{10}H_8C(O)NH_2 \cdot N_2]_2$.

The compounds of the invention and their preparation are illustrated further in the examples which follow. Examples A and B illustrate the preparation of representative products which are employed as reactants.

Example A (A) Preparation of bis(dimethylsulfide)decaborane (12).—A reaction vessel having a capacity of about 365 parts of water is charged with 0.79 part of decaborane (14), cooled in liquid nitrogen, and then evacuated to a pressure of 10 microns of mercury. Approximately 21 parts of methyl sulfide is condensed onto the decaborane in the reaction vessel. The reaction vessel is closed, allowed to warm to room temperature (ca. 25° C.) and stand for 4 days. During this period, 6.6 millimoles of hydrogen is evolved. The reaction vessel is opened and excess methyl sulfide is removed by distillation, leaving a practically quantitative yield of white solid residue of $B_{10}H_{12} \cdot 2S(CH_3)_2$. The compound is crystallized from ethyl acetate and it melts at 122–124° C. The compound is called bis(dimethylsulfide)decaborane(12).

(B) Preparation of $(NH_4)_2B_{10}H_{10}$ and $[(CH_3)_3CNH_3]_2B_{10}H_{10}$

Bis(dimethylsulfide)decaborane(12) (8.5 g.) is mixed with 50 ml. of liquid ammonia and stirred in a round-bottom reaction vessel for one hour with the vessel being cooled to a temperature of about −50° C. by partial immersion in a mixture of solid carbon dioxide and acetone. The cooling bath is then removed and the excess ammonia is allowed to evaporate while the solution is stirred. The remaining traces of ammonia are removed by subjecting the residue to a high vacuum (0.01 mm. of mercury) at 25° C. There is obtained 5.6 g. of crude diammonium decahydrodecaborate(2−), i.e., $(NH_4)_2B_{10}H_{10}$ The product is purified by crystallization from ammonia.

By substituting tert.-butylamine for liquid ammonia in the above process, the compound $[(CH_3)_3CNH_3]_2B_{10}H_{10}$ is obtained. The tert.-butylamine salt can also be obtained by reacting $(CH_3)_3CNH_2$ with an aqueous solution of the acid whose preparation is described in part C which follows.

(C) Preparation of hydrate of $H_2B_{10}H_{10}$, i.e.

$(H_3O)_2B_{10}H_{10} \cdot nH_2O$

An aqueous solution of 40 g. of diammonium decahydrodecaborate(2−), prepared as described in part B, is passed through a column packed with 2000 ml. of a commercial acidic ion-exchange resin of the polystyrenesulfonic acid type. The aqueous effluent is warmed to about 40° C. and it is evaporated under reduced pressure (less than 1 mm. of Hg) to yield a yellow liquid acid which is hydrated dihydrogen decahydrodecaborate(2−). It is not essential to remove all of the water and it is, in fact, preferable to use acid having a substantial degree of hydration. The concentration of $H_2B_{10}H_{10}$ or $(H_3O)_2B_{10}H_{10}$ is determined by titration of an aliquot portion of the concentrated effluent. The quantity of hydrated acid which is desired for use as a reactant can be calculated by conventional methods.

Example B

Preparation of $NaB_{10}H_9 \cdot S(CH_3)_2$.—A glass reaction vessel, equipped with a stirrer and immersed in an ice bath, is charged with a solution of 40 g. of $(NH_4)_2B_{10}H_{10}$ in 200 ml. of $(CH_3)_2SO$. The solution is stirred and cooled while hydrogen chloride gas is passed through it for 5 minutes at a rate sufficient to maintain the reaction temperature at 44–65° C. At the end of this period, the reaction mixture is poured into 500 ml. of water and the solid which precipitates is separated by filtration. An aqueous solution of $(CH_3)_4NCl$ is added with stirring to the filtrate. The precipitate which forms is separated, dried and recrystallized from water to obtain $(CH_3)_4NB_{10}H_9 \cdot S(CH_3)_2$ The tetramethylammonium compound, obtained above, is dissolved in hot water and the solution is passed through a column packed with a commercial acid ion-exchange resin of the sulfonic acid type. The acidic effluent is a solution of $HB_{10}H_9 \cdot S(CH_3)_2$ and it is neutralized (titrated) with aqueous NaOH to obtain $NaB_{10}H_9 \cdot S(CH_3)_2$ The solution of the sodium salt can be employed directly in further reactions or it can be evaporated to obtain the pure sodium salt as a hydrate.

Example 1

(A) A solution consisting of 20 g. of $(NH_4)_2B_{10}H_{10}$ in 150 ml. of water is mixed with a solution of 100 g. of $NaNO_2$ in 250 ml. of water. The solution is chilled to 0–10° C. and a handful of cracked ice is added. As the next step, 200 ml. of 16% hydrochloric acid is added in small portions with stirring and ice is added as needed to keep the temperature of the reaction mixture below 15° C. A solid forms which is separated by filtration to give the solid and Filtrate "A." The solid is dissolved in methanol and $NaBH_4$ is added in sufficient quantity to reduce the intermediate product. The solution is stirred for a few minutes, water is added and $B_{10}H_8 \cdot 2N_2$ precipitates. The compound is separated by filtration and recrystallized from aqueous ethanol. Zinc and hydrochloric acid are added to Filtrate "A" and the mixture is stirred. A further quantity of $B_{10}H_8 \cdot 2N_2$ precipitates and it is purified as described earlier. The total quantity of bis(diazonium)octahydrodecaborane(8) which is obtained is 5.2 g. The compound does not melt when heated to 350° C.

*Analysis.*—Cac'd for $B_{10}H_8 \cdot 2N_2$: B, 62.8; H, 4.6; N, 32.6; mol. wt., 172. Found: B, 62.1; H, 4.9; N, 33.3; mol. wt., 169, 175.

(B) An aqueous solution of nitrous acid is prepared by adding hydrochloric acid carefully to a cold solution (0° C. or less) of sodium nitrite until the solution is slightly acid. The cold solution is added slowly and with stirring to a cold solution of $NaB_{10}H_9 \cdot S(CH_3)_2$. The brown solid, which precipitates, is separated by filtration, washed with water and dried. The product which contains an inner diazonium salt of the decaborane described in part A, shows absorption bands in the infrared spectrum at $4.0\mu$, strong; $4.2\mu$, medium, and $4.4\mu$, weak.

(C) A solution of nitrous acid is prepared by dissolving 4.14 g. of sodium nitrite in 60 ml. of 1 N hydrochloric acid. The solution is cooled to approximately 0° C. in ice-water and there is added to it slowly and with vigorous stirring a solution of 1.5 g. of bis(tetramethylammonium)decahydrododecaborate(2−) in 25 ml. of water. A dark brown solution is obtained which contains brown solid material. The solid material is isolated by filtration. Care must be exercised in the isolation step as the solid is explosive and, when dry, detonates on touching with a rod. The filtrate, free of solid, is treated with an excess of an aqueous solution of tetraethylammonium bromide. A brown solid precipitates which is separated by filtration. This product, originally believed to be principally bis(tetraethylammonium) mononitrosononahydrodecaborate(2−), i.e., $[(C_2H_5)_4N]_2B_{10}H_9NO$, is sensitive to shock and it must be handled with caution. The product contains 13.42% nitrogen and its infrared spectrum shows bands at $4.2\mu$ (characteristic for B—H bonds) and at $4.5\mu$, which is characteristic for the diazonium (N$^+$=N$^-$) group. The product, therefore, contains, at least in part, a compound having ($N_2$) groups.

(D) A mixture of 0.5 g. of $H_2B_{10}H_8(NH_2)_2$ and 20 ml. of 1,2-dimethoxyethane is stirred and cooled in ice water. Excess sodium hydride is added carefully with continued stirring to form a solution of $Na_2B_{10}H_8(NH_2)_2$. The solution is filtered in a nitrogen atmosphere to remove excess sodium hydride. Nitrosyl chloride is passed slowly into the filtrate and a vigorous exothermic reaction sets in. Passage of the nitrosyl chloride is continued until the reaction subsides. The reaction mixture is filtered, the filtrate is diluted with water and $B_{10}H_8(N_2)_2$ precipitates. It is separated, washed and dried to obtain 0.15 g. of product. The compound is purified by recrystallization from 50% aqueous ethanol.

The procedure described above illustrates the diazotization of amino-substituted decaborates to obtain the compounds of the invention.

Example 2

Two solutions are prepared consisting of (1) 65 ml. of water and 18 g. of $NaNO_2$ and (2) 200 ml. of water and 20 g. of $(NH_4)_2B_{10}H_{10}$. Both solutions are chilled to below 15° C. and they are combined. A solution (65 ml.) of 12% hydrochloric acid is chilled to below 15° C. and added to the combined solution with stirring and cooling to keep the temperature low. The dark reaction mixture is filtered and excess zinc and hydrochloric acid are added to the filtrate. The solid which forms, and unreacted zinc, are separated by filtration and the crude solid is extracted with ethanol to separate the boron compound from zinc. The ethanol extract is diluted with water and the solid which forms is separated by filtration to obtain 1.8 g. of $B_{10}H_8 \cdot 2N_2$. The infrared spectrum of the compounds shows strong absorption bands at $4.0\mu$ and $4.5\mu$.

An aqueous solution of CsCl is added with stirring to the filtrate from the aqueous ethanol solution obtained above. The precipitate which forms is separated by filtration, washed and dried to obtain $CsB_{10}H_9 \cdot N_2$ as a white crystalline solid.

Example 3

A solution consisting of 20 g. of the dihydrate of $H_2B_{10}H_{10}$ in 600 ml. of water is cooled to less than 10° C. and to it there is added slowly and with stirring a cooled solution (less than 10° C.) consisting of 18 g. of sodium nitrite ($NaNO_2$) in 50 ml. of water. The reaction mixture, which now is a dark brown solution, is stirred for 30 minutes at atmospheric temperature (ca. 25° C.). Zinc dust, in excess, is added and the mixture is stirred again for 20 minutes. It is allowed to stand overnight and then filtered. An acid ion-exchange resin of the poly(arylsulfonic acid) type is added to the filtrate as well as a small quantity of $NaNO_2$. The mixture is stirred for a short period, filtered and the filtrate is stirred with excess zinc and hydrochloric acid. A precipitate forms which is separated by filtration, extracted with ethanol and the extract is evaporated to obtain $B_{10}H_8 \cdot 2N_2$. The compound is further purified by crystallization from aqueous ethanol.

*Analysis.*—Calc'd for $B_{10}H_8 \cdot 2N_2$: B, 62.8; N, 32.6; mol. wt., 172. Found: B, 60.9; N, 32.5; mol. wt., 175, 180.

The filtrate from the zinc-hydrochloric acid reduction step described above is mixed with sufficient aqueous sodium hydroxide solution to become strongly basic. Aqueous trimethylsulfonium iodide solution is added to the basic solution with stirring to precipitate $(CH_3)_3SB_{10}H_9 \cdot N_2$ The compound is separated by filtration, washed thoroughly and dried.

*Analysis.*—Calc'd for $(CH_3)_3SB_{10}H_9 \cdot N_2$: B, 48.6; N, 12.6. Found: B, 45.9; N, 15.0.

A solution of the above compound, passed through a column filled with a commercial acid ion-exchange resin, yields an aqueous solution of the acid, $HB_{10}H_9 \cdot N_2$.

Example 4

(A) A nitrous acid solution is prepared at about 0° C. (ice-water temperature) consisting of 10 ml. of water, 1.4 g. of $NaNO_2$ and 6 ml. of 12% HCl solution. The nitrous acid solution is added with stirring to a chilled solution (0–10° C.) consisting of 25 ml. of water and 4.0 g. of

21 the hydrate of $NaB_{10}H_9 \cdot S(CH_3)_2$. A brown solid forms which is separated by filtration and washed thoroughly with water. The solid is extracted three times with ethanol. The ethanol extracts are combined to form a clear red solution, zinc and hydrochloric acid are added in excess, and the mixture is stirred until the color changes from red to green. The solution is separated from unreacted zinc and the liquid is diluted with three times its volume of water. The precipitate which forms is separated, washed and dried to yield 0.25 g. of $$B_{10}H_8 \cdot S(CH_3)_2 \cdot N_2$$

The compound is recrystallized from aqueous ethanol. It melts at 135–137° C.

*Analysis.*—Calc'd for $B_{10}H_8 \cdot S(CH_3)_2 \cdot N_2$: B, 52.5; C, 11.6; H, 6.8; N, 13.6; mol. wt., 206. Found: B, 52.4; C, 12.2; H, 7.8; N, 14.0; mol. wt., 201.

(B) A solution of nitrous acid, prepared as described in part A, is added with stirring to a cold solution of $NaB_{10}H_9 \cdot S(CH_3)_2$. A brown solid forms which is separated by filtration. The product is washed with water and dissolved in ethanol to form a dark brown solution. Zinc dust and hydrochloric acid are added in excess to the solution and the mixture is stirred at atmospheric temperature (ca. 25° C.) until the color becomes light green. The mixture is allowed to stand until the insoluble material settles and the supernatant liquid is separated. Water is added to this liquid with stirring. The light green precipitate which forms is separated by filtration and washed. The product, which is $B_{10}H_8 \cdot S(CH_3)_2 \cdot N_2$, is not shock sensitive. Further purification by crystallization from aqueous ethanol yields the compound as an orange-yellow solid. The infrared spectrum of the product shows absorption at 4.0μ and 4.5μ, characteristic for the B—H bond and the $(N_2)$ group.

(C) Two solutions are prepared consisting of (1) 35 g. of $NaNO_2$ in 100 ml. of water, and (2) 16.2 g. of $$NaB_{10}H_9 \cdot S(CH_3)_2$$

in 200 ml. of water. The solutions are combined with stirring, cooled to below 15° C., and 100 ml. of 7% hydrochloric acid solution is added slowly with stirring. The reaction mixture is cooled during this step to keep the temperature below 15° C. After addition is completed, the solution is stirred 20 minutes at a temperature of about 25° C. The solid which forms is separated and dissolved in methanol. Excess $NaBH_4$ is added to the methanol solution with stirring and the solution is evaporated under reduced pressure until a solid begins to separate. The concentrated solution is now diluted with water and the solid which forms is separated. It is washed and dried to yield 3.5 g. of $B_{10}H_8 \cdot S(CH_3)_2 \cdot N_2$. The product is identical with the compound obtained in part A by zinc-hydrochloric acid reduction.

Example 5

(A) A mixture of 2.0 g. of $B_{10}H_8 \cdot 2N_2$ and 10 ml. of N-methyl-2-pyrrolidone is boiled for one minute. It is cooled and poured into about 50 ml. of water. The solid which precipitates is separated by filtration. It is dissolved in acetone and reprecipitated with water. There is obtained 1.6 g. of product containing

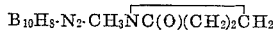

i.e., diazonium - (N - methyl - 2 - pyrrolidone)octahydrodecaborane(8). The compound is a white crystalline solid.

(B) A mixture is prepared consisting of approximately 0.5 g. each of N-methyl-2-pyrrolidone and $B_{10}H_8 \cdot 2N_2$. The mixture is boiled about 10 seconds, cooled and diluted with water. The solid which forms is separated by filtration, to obtain

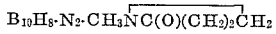

The infrared spectrum of the compound shows absorption bands for the B—H bonds and for the $(N_2)$ and carbonyl groups.

22

Example 6

A solution consisting of 25 ml. of hydrazine (95%+) and 1 g. of $B_{10}H_8 \cdot 2N_2$ is refluxed for one hour, cooled and filtered to remove a small quantity of insoluble material. The filtrate is evaporated to leave a white solid which is crystallized from water. There is obtained, as white crystals, a compound of the empirical formula $B_{10}H_{12}N_4$ which can be viewed as $B_{10}H_8 \cdot N_2 \cdot N_2H_4$, i.e., a species of the class of Formula 3 which bears no ionic charge, or as [H] $[B_{10}H_8(NHNH_2) \cdot N_2]$, i.e., a species of the class of Formula 2, where the proton, [H], is associated so closely with the hydrazino substituent that the compound is essentially neutral or, at most, weakly acidic. The compound behaves in many chemical reactions as a neutral species, i.e., $B_{10}H_8 \cdot N_2 \cdot N_2H_4$. However, in the presence of strong bases it will form salts, e.g., $$NaB_{10}H_8(NHNH_2) \cdot N_2$$

$TlB_{10}H_8(NHNH_2) \cdot N_2$, and the like.

Example 7 which follows, and also Example 10, employ $B_{10}H_8(CO)_2$ as a reactant. This procedure is preferred for the preparation of fully halogenated compounds of the invention. The reactant $B_{10}H_8(CO)_2$ is derived from $B_{10}H_8(N_2)_2$ of Example 1, and its preparation is described fully in my copending U.S. Patent 3,166,378. A representative preparation is also described later in the paragraphs discussing reactions of $B_{10}H_8(N_2)_2$.

Example 7

(A) A solution consisting of 1.0 g. of $B_{10}H_8(CO)_2$ in 20 ml. of acetonitrile is added dropwise and with stirring to a slurry of 0.9 g. of sodium azide in 10 ml. of acetonitrile. The temperature rises to 50° C. and 250 ml. of nitrogen gas is evolved over a 1-hour period. The reaction mixture is filtered into an aqueous solution of $(CH_3)_4NCl$ and the solid which precipitates is separated. It is crystallized from water to obtain 0.7 g. of $$[(CH_3)_4N]_2B_{10}H_8(NCO)_2$$

The reaction is repeated several times to obtain a further supply of product.

A solution of 4.0 g. of $[(CH_3)_4N]_2B_{10}H_8(NCO)_2$ in 125 ml. of $CH_3CN$ is cooled to 5° C. and chlorine gas is passed through for 4.5 hours, maintaining the temperature at 5–10° C. The solution, which is dark blue, is allowed to stand about 18 hours at atmospheric temperature and the blue color fades to yellow. The solid is removed by evaporation to obtain a viscous liquid as the residue. The liquid is stirred with ethyl alcohol and a solid separates. The solid, which is $[(CH_3)_4N]_2B_{10}Cl_8(NCO)_2$, is removed and dried to obtain 5.6 g. of product. The process is repeated to obtain a further supply of the compound.

About 5 g. of $[(CH_3)_4N]_2B_{10}Cl_8(NCO)_2$, is mixed with 100 ml. of 5% NaOH solution and the mixture is refluxed for a short time. The mixture is cooled and passed through a column filled with a commercial acid ion-exchange resin to obtain, as the eluate, an aqueous solution of $H_2B_{10}Cl_8(NH_2)_2$ which is evaporated to dryness to yield as a residue the solid product which can be viewed either as $H_2B_{10}Cl_8(NH_2)_2$ or as $B_{10}Cl_8(NH_3)_2$ in which the two acidic hydrogens are associated closely with the —$NH_2$ groups. The reaction is repeated to obtain a further supply of $H_2B_{10}Cl_8(NH_2)_2$.

Ten grams of $NaNO_2$ is added with stirring to a solution of 14.5 g. of $H_2B_{10}Cl_8(NH_2)_2$ in 300 ml. of water. Stirring is continued and 20 ml. of glacial acetic acid is added. The mixture is stirred 2 hours and filtered to separate the solid material which is set aside. The filtrate is mixed with 10 g. of $NaNO_2$ and 5 ml. of glacial acetic acid, stirred for one hour and filtered again to separate the solid material. The two portions of solid products are combined and extracted three times with alcohol. The insoluble portion is dried to obtain 10.8 g. of $B_{10}Cl_8(N_2)_2$. The alcohol extracts are combined, evaporated to a small volume and filtered. The filtrate is diluted with a large volume of water and crystalline $HB_{10}Cl_8NH_2 \cdot N_2$ precipitates. It is separated, washed and dried to obtain 2.1 g. of product.

(B) Using the procedure essentially as described in part B, a solution of 2.0 g. of $H_2B_{10}Cl_8(NH_2)_2$ and 4 g. of $NaNO_2$ in 30 ml. of $H_2O$ are reacted with 5 ml. of concentrated hydrochloric acid to obtain $B_{10}Cl_8(N_2)_2$ and $HB_{10}Cl_8NH_2 \cdot N_2$. The compound, $B_{10}Cl_8(N_2)_2$, is purified by crystallization from ethanol-ethyl acetate mixture.

*Analysis.*—Calc'd for $B_{10}Cl_8(N_2)_2$: B, 24.1; N, 12.5. Found: B, 24.4; N, 12.7.

(C) A solution of 13 g. of $H_2B_{10}Cl_8(NH_2)_2$ and 25 g. of $NaNO_2$ in 20 ml. of water is cooled to 0–5° C. by adding cracked ice, and 10 ml. of concentrated hydrochloric acid is added with stirring. The mixture is stirred for 10 minutes at 0–5° C., 10 ml. of concentrated hydrochloric acid is again added and stirring is continued for 30 minutes with the temperature rising gradually to about 20–25° C. A quantity of $NaNO_2$ (10 g.) is now added and the mixture is stirred 1 hour at atmospheric temperature. The mixture is filtered and the solid which is separated, is extracted repeatedly with ethanol. The insoluble portion is dried to yield 6.0 g. of $B_{10}Cl_8(N_2)_2$. The ethanol extracts are combined and the mixture is evaporated in a stream of air until it begins to become viscous. It is now filtered into water and $HB_{10}Cl_8NH_2 \cdot N_2$, also written as $B_{10}Cl_8NH_3 \cdot N_2$ precipitates. The compound is separated and recrystallized from water. Its identity is confirmed by elemental analysis.

*Analysis.*—Calc'd for $B_{10}Cl_8NH_3 \cdot N_2$: B, 24.8; Cl, 64.9; N, 9.6. Found: B, 24.4; Cl. 64.6; N, 9.2.

The ultraviolet absorption spectrum in acetonitrile solution yields the following data: $\lambda_{max.}$, 276 m$\mu$ ($\epsilon = 15{,}500$).

(D) A solution of $H_2B_{10}Cl_8(NH_2)_2$ in water is neutralized with aqueous $(CH_3)_4NOH$ and evaporated to dryness to obtain $[(CH_3)_4N]_2B_{10}Cl_8(NH_2)_2$. A solution of 10 g. of this salt in 150 ml. of acetonitrile is cooled to 5° C. and 20 g. of NOCl is added slowly with stirring and cooling of the solution. A very fast exothermic reaction occurs and the temperature rises sharply to 30° C. After the reaction subsides, the solution is evaporated with a stream of air to a volume of about 40 ml. The residual liquid is diluted with 100 ml. of water and the precipitate which forms is separated. There is obtained 7.6 g. of $B_{10}Cl_8(N_2)_2$ which is recrystallized from 30 ml. of acetonitrile to obtain 2.5 g. of pure compound.

(E) The compound obtained in part C $[B_{10}Cl_8NH_3 \cdot N_2]$ is dissolved in an aqueous solution of sodium hydroxide to form a yellow solution. An aqueous solution of CsCl is added with stirring and the precipitate which forms is separated, washed, dried and recrystallized from water to yield brownish-yellow needles of $CsB_{10}Cl_8NH_2 \cdot N_2$.

*Analysis.*—Calc'd for above cesium salt: Cs, 23.5; B, 19.0; N, 7.4. Found: Cs, 22.0; B, 19.1; N, 7.4.

The ultraviolet absorption spectrum of

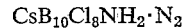
$CsB_{10}Cl_8NH_2 \cdot N_2$ in acetonitrile solution yields the following data: $\lambda_{max.}$, 362 m$\mu$ ($\epsilon = 1850$), 307 m$\mu$ ($\epsilon = 13{,}300$).

Example 8

A solution is prepared consisting of 13 g. of

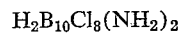
$H_2B_{10}Cl_8(NH_2)_2$ 15 g. of $NaNO_2$ and 200 ml. of water. Cracked ice is added to the solution and 7 ml. of concentrated hydrochloric acid is added with stirring. The mixture is stirred for 10 minutes, 10 ml. of concentrated hydrochloric acid is added, and the mixture is stirred for 15 minutes. It is filtered to separate solid material and 20 g. of $NaNO_2$ is added to the filtrate. The solution is allowed to stand for 17 hours and filtered again. The solid products obtained from the two filtrations are combined. The products are mixtures of $B_{10}Cl_8(N_2)_2$ and $HB_{10}Cl_8NH_2(N_2)$. The combined mixture is washed repeatedly with ethanol and leaves, as the insoluble portion, 7 g. of $B_{10}Cl_8(N_2)_2$. The product is purified by recrystallization from solution in a mixture of equal parts of ethanol and ethyl acetate to obtain 3.0 g. of pure $B_{10}Cl_8(N_2)_2$.

An aqueous solution of $(CH_3)_3SI$ is added to the mother liquors remaining from the recrystallization step in the preceding paragraph. The precipitate which forms is separated and it is recrystallized from aqueous ethanol to obtain 1.0 g. of $(CH_3)_3SB_{10}Cl_8OH(N_2)$.

*Analysis.*—Calc'd for $(CH_3)_3SB_{10}Cl_8OH(N_2)$: B, 21.1; C, 7.0; H, 1.9; N, 5.4; S, 6.2. Found: B, 21.1; C, 7.4; H, 2.3; N, 6.1; S, 6.1.

Example 9

A reaction vessel is charged with 20 ml. of water and 0.5 g. of $[(CH_3)_3CNH_3]_2B_{10}H_{10}$. Cracked ice is added to the mixture to reduce the temperature to less than 10° C. and a solution of 0.13 g. of $NaNO_2$ in 10 ml. of water is added. The mixture is stirred and about 2.0 ml. of concentrated hydrochloric acid is added. A vigorous reaction sets in and the solution is cooled and stirred until the reaction subsides. Liquid bromine (2.5 g.) is added to the mixture and stirring is continued for about 20 minutes. At the end of this period 1.5 g. of $NaBH_4$ is added with stirring. The solution becomes clear yellow in color. Aqueous $(CH_3)_4NCl$ solution is added and the precipitate which forms is separated to obtain 0.37 g. of $(CH_3)_4NB_{10}H_2Br_7 \cdot N_2$. The compound does not melt when heated to 360° C. and shows only slight discoloration at this temperature. The infrared spectrum of the compound shows absorption bands at 4.18$\mu$ (very weak), 3.9$\mu$ (moderate) and 4.4$\mu$ (moderate).

*Analysis.*—Calc'd. for $(CH_3)_4NB_{10}H_2Br_7 \cdot N_2$: B, 14.0; C, 7.8; H, 1.8; Br, 72.5; N, 5.4. Found: B, 13.0; C, 9.4; H, 2.8; Br, 69.9; N, 3.6.

Contacting an aqueous solution of the above compound with an acidic ion-exchange resin will yield an aqueous solution of $HB_{10}H_2Br_7 \cdot N_2$.

Example 10

A solution of 15 g. of CsCl in 15 ml. of water is added with stirring to a solution of 6.0 g. of $B_{10}H_8(CO)_2$ in 50 ml. of water. The mixture is chilled in an ice bath and $Cs_2B_{10}H_8[C(O)OH]_2$ precipitates. The compound is separated, washed and dried in air. It is added to a solution of 30 g. of $I_2$ in 250 ml. of tetrachloroethane and the mixture is stirred for 1 hour and a solution of 60 g. of ICl in 40 ml. of tetarachloroethane is added. The mixture is again stirred for 1 hour and then refluxed for about 18 hours. It is cooled and the solid which forms is separated. The solid product is stirred for a short time with 200 ml. of water and separated by filtration. The solid is dried, powdered in a mortar and heated at steam bath temperatures for 15 minutes. It is recrystallized from 60 ml. of water to obtain 32.4 g. of $Cs_2B_{10}I_8[C(O)OH]_2$.

*Analysis.*—Calc'd for above salt: Cs, 18.0; B, 7.3; C, 1.6; I, 68.5. Found: Cs, 17.9; B, 7.3; C, 1.9; I, 68.3

A saturated aqueous solution of 16.3 g. of $Cs_2B_{10}I_8[C(O)OH]_2$ is passed through a column filled with commercial acid ion-exchange resin and the effluent is collected. The volume of the effluent is adjusted to 50 ml. by addition of water and 20 g. of $H_2NOSO_3H$ is added. The solution is refluxed until a dark oil separates. Water (100 ml.) and $H_2NOSO_3H$ (10 g.) are added and refluxing is continued for 6 hours. The solution is cooled and the precipitate which forms is separated to obtain 2.5 g. of $H_2B_{10}I_8(NH_2)_2$. The compound is purified by crystallization from aqueous acetonitrile.

*Analysis.*—Calc'd for $H_2B_{10}I_8(NH_2)_2$: B, 9.4; N, 2.4. Found: B, 9.4; N, 2.0.

The above compound [which can be written as $B_{10}I_8(NH_3)_2$] is dissolved in 50% aqueous alcohol, a small amount of $NaNO_2$ is added followed by a small amount of glacial acetic acid. On standing, $B_{10}I_8(N_2)_2$ separates slowly as a yellow crystalline solid. The infrared absorption spectrum shows characterizing bands at 4.4μ (—$N_2$) and at 10.35μ and 11.2μ (for the boron cage structure).

*Analysis.*—Calc'd for $B_{10}I_8(N_2)_2$: B, 2; N, 4.8. Found: B, 9.1; N, 5.0.

Examples 9 and 10 illustrate generic processes for obtaining compounds of the invention which bear halogen substituents. In the process of Example 9, as illustrated, the intermediate diazonium compound is not separated but is halogenated directly in the reaction mixture. In an optional mode of operation, the product $B_{10}H_8 \cdot 2N_2$ can be isolated and then halogenated. To illustrate, $B_{10}H_8 \cdot 2N_2$ is dissolved in ethanol and chlorine is bubbled into the solution. The reaction mixture is processed to obtain products bearing chlorine substituents, e.g., $B_{10}H_5Cl_3 \cdot 2N_2$, $B_{10}HCl_7 \cdot 2N_2$ and $B_{10}Cl_8 \cdot 2N_2$. In like manner, $I_2/ICl$ is employed to obtain compounds bearing iodine substituents, e.g., $B_{10}H_6I_2 \cdot 2N_2$, $B_{10}H_2I_6 \cdot 2N_2$ and $B_{10}I_8 \cdot 2N_2$. The number of halogen substituents can be controlled by the quantity of halogen employed as a reactant and by the duration of the reaction.

In the process of Example 10, a compound of Formula 19 is employed in which one or more of the X groups are halogen. The process can be applied to any halogen-bearing compound of Formula 19. To illustrate, $H_2B_{10}Cl_8(NH_2)_2$ yields $B_{10}Cl_8(N_2)_2$, $H_2B_{10}Br_8(NH_2)_2$ yields $B_{10}Br_8(N_2)_2$, $H_2B_{10}H_7F(NH_2)_2$ yields $B_{10}H_7F(N_2)_2$, $H_2B_{10}H_5Cl_3(NH_2)_2$ yields $B_{10}H_5Cl_3(N_2)_2$, $H_2B_{10}H_4Br_4(NH_2)_2$ yields $B_{10}H_4Br_4(N_2)_2$, and the like. The corresponding acids are obtained from monoamines, e.g., $H_2B_{10}Cl_9NH_2$ yields $HB_{10}Cl_9(N_2)$, $H_2B_{10}Br_9NH_2$ yields $HB_{10}Br_9(N_2)$, $H_2B_{10}H_8FNH_2$ yields $HB_{10}H_8F(N_2)$, $H_2B_{10}H_6Cl_3NH_2$ yields $HB_{10}H_6Cl_3(N_2)$, $H_2B_{10}H_5Br_4NH_2$ yields $HB_{10}H_5Br_4(N_2)$, and the like. Compounds bearing mixed substituents can be employed as reactants in the process. To illustrate $H_2B_{10}H_2Cl_4(OC_2H_5)_2(NH_2)_2$ yields $B_{10}H_2Cl_4(OC_2H_5)_2(N_2)_2$, $H_2B_{10}Cl_4Br_2(CN)_2(NH_2)_2$ yields $B_{10}Cl_4Br_2(CN)_2(N_2)_2$, and the like.

Example 11

A mixture of 1.0 g. of $B_{10}H_8(N_2)_2$, 4.0 g. of $NaN_3$, 50 ml. of ethanol and 50 ml. of water is refluxed for 72 hours to form a clear yellow solution. The solution is cooled and an aqueous solution of $(CH_3)_4NOH$ is added with stirring. The precipitate which forms is separated, washed and dried to yield $(CH_3)_4NB_{10}H_8N_3 \cdot N_2$ as an almost white shock sensitive crystalline product.

*Analysis.*—Calc'd. for $(CH_3)_4NB_{10}H_8N_3 \cdot N_2$: B, 41.5; C, 18.4; H, 7.7. Found: B, 41.3; C, 18.8; H, 7.9.

The ultraviolet absorption spectrum of the compound in solution in acetonitrile yields the following data: $\lambda_{max}$, 284 mμ (ε=21,900), 218 mμ (ε=14,100).

Example 12

A mixture of 2.0 g. of $B_{10}Cl_8(N_2)_2$, prepared as described in Example 7, part A, 1 g. of $NaN_3$ and 60 ml. of $CH_3CN$ is stirred for 20 minutes and then refluxed for 30 minutes. Nitrogen gas is released in this step. The solution is cooled, filtered and the filtrate is evaporated in a stream of air until a viscous liquid remains. Aqueous CsCl solution is mixed with the residue and the white solid which forms is separated. It is recrystallized from water to obtain 0.9 g. of $CsB_{10}Cl_8N_3 \cdot N_2$, i.e., cesium diazoniumazidooctachlorodecaborate (1−).

*Analysis.*—Calc'd for $CsB_{10}Cl_8N_3 \cdot N_2$: Cs, 22.2; B, 18.1; N, 11.7; Cl, 47.4. Found: Cs, 21.1; B, 17.8; N, 11.5; Cl, 48.2.

The ultraviolet absorption spectrum of the compound in solution in water yields the following data: $\lambda_{max}$, 285 mμ (ε=18,800). The infrared spectrum shows absorption at 4.4μ (for —$N_2$) and 4.7μ (for —$N_3$).

Examples 11 and 12 illustrate the preparation of compounds of Formula 1 in which the X groups are azide and halogen. The process is generic for the preparation of compounds bearing azido substituents.

Example 13

(A) A mixture is prepared consisting of 15 ml. of 5% NaOH and 1.6 g. of

obtained as described in Example 5, part A. The mixture is refluxed until the solid dissolves. The dark red solution is filtered and aqueous $(C_3H_7)_4NOH$ solution is added to the filtrate. A brick-red solid precipitates and it is separated by filtration, washed and dried to obtain $(C_3H_7)_4NB_{10}H_8OH \cdot N_2$, i.e., tetraisopropylammonium diazonium - monohydroxyoctahydrodecaborate(1−). The infrared spectrum shows absorption bands for B—H, the —OH group and the ($N_2$) group. No absorption for a carbonyl group is present.

*Analysis.*—Calc'd for $(C_3H_7)_4NB_{10}H_8OH \cdot N_2$: C, 41.5; B, 31.1; H, 10.7. Found: C, 42.1; B, 30.8; H, 11.0.

(B) The procedure of part A is repeated employing about 0.5 g. of

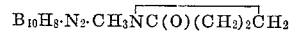

and 0.5 ml. of 10% NaOH. The solution is treated with aqueous $(CH_3H_7)_4NBr$ solution to obtain the product of part A, i.e., $(CH_3H_7)_4NB_{10}H_8OH \cdot N_2$.

Example 13 illustrates the preparation of compounds of the invention bearing hydroxy (—OH) substituents. The hydroxyl substituents can be esterified by reaction of the compounds with acids, acid halides, acid anhydrides, esters, and the like. Thus, the compound of Example 13 can be passed through an acid ion-exchange resin, by procedures described earlier, to obtain $HB_{10}H_8OH \cdot N_2$. This acid can be reacted with acetic acid, acetic anhydride or acetyl chloride to obtain $HB_{10}H_8OC(O)CH_3 \cdot N_2$; with benzoyl chloride to obtain $HB_{10}H_8OC(O)C_6H_5 \cdot N_2$; with acetic anhydride to obtain $HB_{10}H_8OC(O)CH_3 \cdot N_2$; with ethyl acetate to obtain $HB_{10}H_8OC(O)CH_3 \cdot N_2$, and the like. These acids can be reacted with a wide range of compounds to provide salts having desired M groups. Representative salts which can be obtained are illustrated in the following table in which it is understood the formula for the acid reactant includes the hydronium structure.

| Acid reactant | Base or salt reactant | Compound obtained (usually as a hydrate) |
|---|---|---|
| $HB_{10}H_9 \cdot N_2$ | $NH_2NH_2$ | $NH_2NH_3B_{10}H_9 \cdot N_2$ |
| $HB_{10}Cl_8NH_2 \cdot N_2$ | $(CH_3)_2NNH_2$ | $(CH_3)_2NNH_3B_{10}Cl_8NH_2 \cdot N_2$ |
| $HB_{10}H_2Br_7 \cdot N_2$ | $C_6H_5NH_2$ | $(C_6H_5NH_3)B_{10}H_2Br_7 \cdot N_2$ |
| $HB_{10}H_9 \cdot N_2$ | $C_3H_5NH_2$ | $C_3H_5NH_3B_{10}H_9 \cdot N_2$ |
| $HB_{10}H_8OH \cdot N_2$ | $C_5H_5N$ | $C_5H_5NHB_{10}H_8OH \cdot N_2$ |
| $HB_{10}H_8OC(O)CH_3 \cdot N_2$ | $(CH_3)_3SCl$ | $(CH_3)_3SB_{10}H_8OC(O)CH_3 \cdot N_2$ |
| $HB_{10}Cl_8NH_2 \cdot N_2$ | $(C_4H_9)_4POH$ | $(C_4H_9)_4PB_{10}Cl_8NH_2 \cdot N_2$ |
| $H_2B_{10}H_9 \cdot N_2$ | $C_8H_5N=NOH$ | $(C_6H_5N_2)B_{10}H_9 \cdot N_2$ |
| $HB_{10}H_2Br_7 \cdot N_2$ | $CsOH$ | $CsB_{10}H_2Br_7 \cdot N_2$ |
| $HB_{10}H_9 \cdot N_2$ | $RbOH$ | $RbB_{10}H_9 \cdot N_2$ |
| $HB_{10}H_8NHNH_2 \cdot N_2$ | $LiOH$ | $LiB_{10}H_8NHNH_2 \cdot N_2$ |
| $HB_{10}H_9 \cdot N_2$ | $ZnCl_2$ | $Zn(B_{10}H_9 \cdot N_2)_2$ |
| $HB_{10}H_8OH \cdot N_2$ | $MgCl_2$ | $Mg(B_{10}H_8OH \cdot N_2)_2$ |
| $HB_{10}Cl_8NH_2 \cdot N_2$ | $BaCl_2$ | $Ba(B_{10}Cl_8NH_2 \cdot N_2)_2$ |
| $HB_{10}Cl_9 \cdot N_2$ | $SrCl_2$ | $Sr(B_{10}Cl_9 \cdot N_2)_2$ |
| $HB_{10}H_9 \cdot N_2$ | $AgNO_3$ | $AgB_{10}H_9 \cdot N_2$ |
| $HB_{10}H_8OH \cdot N_2$ | $CdCl_2$ | $Cd(B_{10}H_8OH \cdot N_2)_2$ |
| $HB_{10}Cl_8NH_2 \cdot N_2$ | $TlOH$ | $TlB_{10}Cl_8NH_2 \cdot N_2$ |
| $HB_{10}Cl_9 \cdot N_2$ | $Eu(OH)_3$ | $Eu(B_{10}Cl_9 \cdot N_2)_3$ |
| $HB_{10}H_9 \cdot N_2$ | $Zn(NH_3)_4Cl_2$ | $Zn(NH_3)_4(B_{10}H_9 \cdot N_2)_2$ |

The compounds of the invention undergo many chemical reactions whereby the diazonium group ($N_2$) is replaced by other groups. The compounds as a class are versatile intermediates for the preparation of other new and valuable polyboron compounds. The versatility of the compounds is illustrated in the following reactions, employing $B_{10}H_8 \cdot 2N_2$ as the intermediate:

(A) A platinum tube is charged with 1.0 g. of $B_{10}H_8 \cdot 2N_2$ and 15 ml. of liquid ammonia. The tube is sealed and heated at 200° C. for 15 minutes at 1000 lbs./sq. in. external pressure. The tube is cooled, opened and the volatile portion of the reaction mixture is removed by evaporation. A white crystalline solid (0.8 g.) remains which is $B_{10}H_8 \cdot 2NH_3$ or, optionally, $H_2B_{10}H_8(NH_2)_2$. The compound is recrystallized from water.

*Analysis.*—Calc'd for $B_{10}H_8 \cdot 2NH_3$: B, 72.0; N, 18.7. Found: B, 71.; N, 18.6.

The compound of paragraph A, above, is representative of the small class of polyboron compounds, discussed earlier in which the protons (H+) are closely associated with (NH$_2$) groups. The compound, in many respects, acts as a neutral or non-ionic product. However, the compound does form metal salts by reaction in strongly basic solutions.

(B) A glass-lined stainless steel pressure vessel is charged with 3.0 g. of $B_{10}H_8 \cdot 2N_2$ and 40 ml. of iron carbonyl. The vessel is connected to a supply of carbon monoxide, and vessel and contents are heated at 170° C. for 20 minutes under a carbon monoxide pressure of 1000 atmospheres. The pressure vessel is cooled and the reaction mixture is filtered. The filtrate is evaporated to dryness to leave 0.75 g. of $B_{10}H_8(CO)_2$. The compound is purified by subliming at 80° C. under very low pressure (less than 0.1 mm. of Hg). Its identity is confirmed by the infrared spectrum and by elemental analysis. The infrared spectrum shows characterizing bands at the following wavelengths (expressed as microns): 3.92, 4.7, 8.25, and 8.5. The ultraviolet spectrum of the compound in cyclohexane is as follows: Strong maximum at 246 m$\mu$, shoulder at 320 m$\mu$.

*Analysis.*—Calc'd for $B_{10}H_8 \cdot 2CO$: B, 62.7; C, 14.0; H, 4.6; mol. wt., 172. Found: B, 60.4; C, 15.0; H, 5.2; mol. wt., 186.

The compound of paragraph B, $B_{10}H_8 \cdot 2CO$, is soluble in hydrocarbons in the gasoline range. It is useful in preparing resistors from cellulose by the method described later.

The compound, $B_{10}H_8 \cdot 2CO$, also dissolves in water to form a strong acid which is $H_2B_{10}H_8(COOH)_2$ or, written in the hydronium form, $(H_3O)_2B_{10}H_8(COOH)_2$. Titration of the acid solution shows that four protons are present, for which the ionization constants of two protons are of the same magnitude as an inorganic mineral acid, e.g., sulfuric acid, and the ionization constants of the other two protons are in the range of organic acids. The acid forms metal salts, e.g., dithallium and tetrathallium salts. Aqueous solutions of this acid are useful for absorbing basic noxious gases from the atmosphere, e.g., $(CH_3)_3N$, and the like.

UTILITY

The compounds of the invention are generically useful as impregnating agents in the preparation of resistors. To illustrate, a section of cotton string is immersed in a nearly saturated solution of $B_{10}H_8 \cdot 2N_2$ in benzene. The string is withdrawn from the solution and the solvent is removed by drying in air. A free flame is applied to the dried impregnated string and it burns to yield a coherent ash which in size and shape resembles the original string. The residual skeleton is of sufficient coherence to permit embedding in paraffin. The section of residue, so treated, shows a resistance of about 25 ohm/cm. The residue from a control section of string is very small and shapeless and it cannot be handled.

Highly halogenated compounds are useful as impregnating agents for retarding the combustion of cellulosic products.

In the group of compounds which fall within the scope of Formula 2, the component M represents a range of groups which are readily interchangeable by metathetic reactions as described earlier. All of the salts which fall within the scope of Formula 2 can be used to prepare the group of acids represented generically as $H(B_{10}H_{9-y}X_y \cdot N_2)$ or, in aqueous solution, as $(H_3O)B_{10}H_{9-y}X_y \cdot N_2$, by passing aqueous or alcoholic solutions of the salts through an acidic ion-exchange resin as described earlier. The acids of this group are strong acids and they are useful in industrial applications where it is desired to avoid contamination from sulfate, chloride, bromide, chlorate, phosphate, and like strong acid anions. Thus, the acids are useful for etching metals, such as steel, and for rust removal, for pickling, for scale removal and for similar metal processing operations.

The acids, described above, are useful as catalysts in the preparation of esters, e.g., in the reaction of alcohols and organic carboxylic acids, to improve the yields of the desired esters. The acids of the invention are employed for this purpose in the same manner as p-toluenesulfonic acid, sulfuric acid or alcoholic hydrogen chloride.

Aqueous solutions of the acids are useful as agents for absorbing noxious basic materials from the air, e.g., traces of ammonia, loweralkyl amines, and the like. To illustrate, air contaminated with methylamines is passed through an aqueous solution of $H(B_{10}H_8OH \cdot N_2)$ or a solution of $H(B_{10}H_9 \cdot N_2)$ and the amines are removed.

All of the compounds of the invention are useful as components of fireworks compositions to impart a pleasing color and sparkle to the display, e.g., $B_{10}H_8 \cdot N_2$, $(CH_3)_3SB_{10}H_9 \cdot N_2$, $(CH_3)_4NB_{10}H_2Br_7 \cdot N_2$, and like salts, such as the strontium, magnesium and cobalt salts, can be used in such compositions. Compounds bearing X substituents, e.g., halogen, OH, NH$_2$, COOH, C(O)CH$_3$, and like groups, are useful in this field.

As many apparently satisfactorily different embodiments of this invention may be made without departing from the spirit and scope thereof, it is to be understood this this invention is not limited to the specific embodiments thereof as defined in the appended claims.

The embodiments of the invention in which an exclusive property or privilege is claimed are defined as follows:

1. A diazonium compound of the formula $M_{(1-n)}[B_{10}H_{9-n-y}X_y \cdot (N_2) \cdot nZ]_b^{n-1}$ wherein M is a group which forms a cation in aqueous solution; X is a monovalent substituent which has the property of being bondable to a nuclear carbon of an aromatic ring by replacement of hydrogen; Z is selected from the group consisting of diazonium, ammonia, amines, hydrazines, organic sulfides, tertiary phosphines, and amides of carboxylic acids; $n$ is a whole number of from 0 to 1, inclusive; $y$ is an integer of from 0 up to 9—$n$, inclusive; and $b$ is equal to the valence of M.

2. A diazonium compound of claim 1 wherein $n$ is 0.
3. A diazonium compound of claim 1 wherein $n$ is 1.
4. A diazonium compound of claim wherein Z is a diazonium group.
5. A diazonium compound of claim 1 wherein $y$ is 0 and $n$ is 0.
6. A diazonium compound of claim 1 wherein $y$ is 0 and $n$ is 1.
7. A diazonium compound of claim 1 wherein $y$ is 0, $n$ is 1, and Z is a diazonium group.
8. A diazonium compound of claim 1 where X is selected from the group consisting of halogen and a monovalent organic group bonded to boron through an atom selected from the group consisting of nitrogen, carbon, oxygen and sulfur.
9. A diazonium compound of claim 1 wherein X is halogen.
10. A diazonium compound of claim 1 wherein X is hydroxyl.

11. A diazonium compound having the formula
$$B_{10}Cl_8 \cdot 2N_2$$
12. A diazonium compound having the formula
$$B_{10}I_8 \cdot 2N_2$$
13. A diazonium compound having the formula
$$B_{10}H_8 \cdot 2N_2$$
14. A diazonium compound having the formula
$$CsB_{10}H_9 \cdot N_2$$
15. A diazonium compound having the formula
$$B_{10}H_8 \cdot S(CH_3)_2 \cdot N_2$$
16. A diazonium compound having the formula
$$B_{10}H_8 \cdot N_2 \cdot N_2H_4$$
17. A diazonium compound having the formula
$$(CH_3)_4NB_{10}H_2Br_7 \cdot N_2$$
18. A diazonium compound having the formula
$$(C_3H_7)_4NB_{10}H_8OH \cdot N_2$$

References Cited

UNITED STATES PATENTS 2,942,935   6/1960   King et al. ---------- 23—358
3,298,798   1/1967   Zirngiebl et al. -------- 23—358

OTHER REFERENCES

Mutterties et al.: "Chemical and Engineering News," volume 44, pages 88–98 (May 9, 1966).

Wiesboeck et al.: "Journal of the American Chemical Society," volume 83, pages 4108–4109 (Oct. 5, 1961).

OSCAR R. VERTIZ, *Primary Examiner.*

G. PETERS, *Assistant Examiner.*

U.S. Cl. X.R.

23—358; 260—606

UNITED STATES PATENT OFFICE
CERTIFICATE OF CORRECTION

Patent No. 3,427,136                                      February 11, 1969

Walter H. Knoth, Jr.

It is certified that error appears in the above identified patent and that said Letters Patent are hereby corrected as shown below:

Column 3, line 16, "compnuds" should read -- compounds --. Column 4, lines 55 and 56, that portion of the formula reading

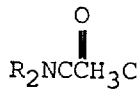   should read   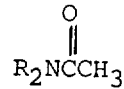

Column 7, line 52, "metal-amine" should read -- metal-ammine --. Column 15, line 27, "Formulas 20 and 21, bearing X groups of one kind, e.g." should read -- the products can be treated with absorptive agents, e.g. --. Column 25, line 9, "B, 2" should read -- B, 9.2 --.

Signed and sealed this 31st day of March 1970.

(SEAL)
Attest:

Edward M. Fletcher, Jr.                    WILLIAM E. SCHUYLER, JR.
Attesting Officer                              Commissioner of Patents